US011662528B2

United States Patent
Lee et al.

(10) Patent No.: US 11,662,528 B2
(45) Date of Patent: May 30, 2023

(54) OPTICAL ASSEMBLY WITH CASSETTE

(71) Applicant: 3M INNOVATIVE PROPERTIES COMPANY, St. Paul, MN (US)

(72) Inventors: Nicholas A. Lee, Woodbury, MN (US); Michael A. Haase, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/250,102

(22) PCT Filed: Jun. 25, 2019

(86) PCT No.: PCT/IB2019/055366
§ 371 (c)(1),
(2) Date: Nov. 25, 2020

(87) PCT Pub. No.: WO2020/003137
PCT Pub. Date: Jan. 2, 2020

(65) Prior Publication Data
US 2021/0215886 A1  Jul. 15, 2021

Related U.S. Application Data

(60) Provisional application No. 62/691,862, filed on Jun. 29, 2018.

(51) Int. Cl.
*G02B 6/38* (2006.01)
*G02B 6/40* (2006.01)

(52) U.S. Cl.
CPC .......... *G02B 6/3825* (2013.01); *G02B 6/383* (2013.01); *G02B 6/406* (2013.01)

(58) Field of Classification Search
CPC ................ G02B 6/383; G02B 6/406
See application file for complete search history.

(56) References Cited

U.S. PATENT DOCUMENTS 4,990,099 A * 2/1991 Marin .................. H01R 13/642
439/221
5,600,747 A    2/1997 Yamakawa
(Continued)

FOREIGN PATENT DOCUMENTS

| JP | 60-057807 | 4/1985 |
| JP | 06-250028 | 9/1994 |

(Continued)

OTHER PUBLICATIONS

International Search Report for PCT International Application No. PCT/IB2019/055366, dated Oct. 15, 2019, 5 pages.

*Primary Examiner* — Omar R Rojas
(74) *Attorney, Agent, or Firm* — Jonathan L. Tolstedt

(57) ABSTRACT

An optical assembly includes a hermaphroditic cassette comprising a hood that includes a narrower section and a wider section. The narrower and wider sections are separated by slots such that the narrower section fits at least partially within a wider section of an identical mating hood of a mating optical assembly and the wider section receives a narrower section of the mating hood. The hood has first and second stop features configured to engage with second and first stop features of the mating hood. The first stop feature comprises a mating end of the narrower section of the hood and the second stop feature comprises a stop surface disposed within the wider section of the hood. Engagement of the stop features of the hood with stop features of the mating hood is configured to stop relative translational movement of the hood and the mating hood along the mating axis during mating.

17 Claims, 17 Drawing Sheets

(56) References Cited

U.S. PATENT DOCUMENTS

| | | |
|---|---|---|
| 5,671,311 A | 9/1997 | Stillie |
| 5,689,598 A | 11/1997 | Dean, Jr. |
| 2012/0099819 A1 | 4/2012 | Valencia |

FOREIGN PATENT DOCUMENTS

| | | |
|---|---|---|
| JP | 2002-311295 | 10/2002 |
| JP | 2004-085714 | 3/2004 |
| WO | WO 2014-055226 | 4/2014 |
| WO | WO 2014/120143 | 8/2014 |
| WO | WO 2015-094811 | 6/2015 |
| WO | WO 2017-065999 | 4/2017 |
| WO | WO 2017-066024 | 4/2017 |
| WO | WO 2017-066037 | 4/2017 |
| WO | WO 2017-066135 | 4/2017 |
| WO | WO 2017-066137 | 4/2017 |
| WO | WO 2017-066139 | 4/2017 |
| WO | WO 2017-116933 | 7/2017 |
| WO | WO 2018-116135 | 6/2018 |
| WO | WO 2019-175702 | 9/2019 |
| WO | WO 2020-003117 | 1/2020 |

\* cited by examiner

OPTICAL ASSEMBLY WITH CASSETTE

TECHNICAL FIELD

This disclosure relates generally to optical ferrules, optical assemblies, and optical connectors that include optical ferrules.

BACKGROUND

Optical connectors can be used for optical communications in a variety of applications including telecommunications networks, local area networks, data center links, and internal links in computer devices. There is interest in extending optical communication to applications inside smaller consumer electronic appliances such as laptops and even cell phones. Expanded optical beams may be used in connectors for these systems to provide an optical connection that is less sensitive to dust and other forms of contamination and so that alignment tolerances may be relaxed. Generally, an expanded beam is a beam that is larger in diameter than the core of an associated optical waveguide (usually an optical fiber, e.g., a multi-mode fiber for a multi-mode communication system). The connector is generally considered an expanded beam connector if there is an expanded beam at a connection point. The expanded beam is typically obtained by diverging a light beam from a source or optical fiber. In many cases, the diverging beam is processed by optical elements such as a lens or mirror into an expanded beam that is approximately collimated. The expanded beam is then received by focusing of the beam via another lens or mirror.

BRIEF SUMMARY

Embodiments are directed to optical assemblies that include optical ferrule cassettes and to tools and methods for installing optical ferrule subassemblies into the cassettes.

According to some embodiments an optical assembly includes a hermaphroditic cassette comprising a hood that includes a narrower section and a wider section. The narrower and wider sections are separated by slots such that the narrower section fits at least partially within a wider section of an identical mating hood of a mating optical assembly and the wider section receives a narrower section of the mating hood. The hood has first and second stop features configured to engage with second and first stop features of the mating hood. The first stop feature comprises a mating end of the narrower section of the hood and the second stop feature comprises a stop surface disposed within the wider section of the hood. Engagement of the stop features of the hood with stop features of the mating hood is configured to stop relative translational movement of the hood and the mating hood along the mating axis during mating.

According to some aspects, each slot has an opening at a mating end of the hood and slot walls that extend to an end of the slot. Engagement of the stop features of the hood with stop features of the mating hood is configured to stop relative translational movement of the hood and the mating hood along the mating axis during mating before the ends of the first and second slots make contact with ends of the first and second slots of the mating hood.

Some embodiments are directed to an optical ferrule subassembly that comprises at least one optical waveguide. An optical ferrule is attached to the optical waveguide at a first location of the optical waveguide. A cable retainer attached to the optical waveguide at a second location of the optical waveguide. The cable retainer has first and second opposing sides that are non-parallel with each other, the non-parallel sides disposed across the optical waveguide.

In some embodiments, the cable retainer has first and second opposing sides that extend laterally across the optical waveguide and third and fourth opposing sides that extend between the first and second sides, wherein the third side is shorter than the fourth side.

Some embodiments involve an optical assembly that includes one or more optical ferrule subassemblies that each comprises at least one optical waveguide, an optical ferrule attached to the optical waveguide at a first location, and a cable retainer attached to the optical waveguide at a second location. The cable retainer has two opposing sides that are non-parallel with each other extending laterally across the optical waveguide and two opposing sides that extend between the non-parallel sides. The optical assembly further includes a cassette configured to hold the optical ferrule subassemblies. The cassette comprises one or more retainer mounts. Each retainer mount is configured to receive a cable retainer of one optical ferrule subassembly.

According to some embodiments, an optical assembly includes a cassette configured to contain one or more optical ferrule subassemblies. Each optical ferrule subassembly comprises at least one optical waveguide, an optical ferrule attached to the optical waveguide at a first location, and a cable retainer attached to the optical waveguide at a second location. The cable retainer has two opposing sides that are non-parallel with each other extending laterally across the optical waveguide, and two opposing sides that extend between the two non-parallel sides. The cassette comprises one or more retainer mounts. Each retainer mount is configured to receive a cable retainer of at least one optical ferrule subassembly. Each retainer mount has a first surface extending from an inner wall of the cassette and oriented at a non-perpendicular angle with respect to a mating axis of the cassette, the first surface configured to engage one of the non-parallel sides of the cable retainer.

In accordance with some embodiments, an optical assembly includes a cassette having sides that define an interior space configured to contain at least one optical ferrule subassembly. The at least one optical ferrule subassembly comprises at least one optical waveguide, an optical ferrule attached to the optical waveguide at a first location of the optical waveguide, and a cable retainer attached to the optical waveguide at a second location of the optical waveguide. The cassette has one or more flexible latching members configured to hold the cable retainer within the interior space of the cassette.

Some embodiments are directed to an insertion tool for assembling an optical assembly that includes multiple optical ferrule subassemblies. The insertion tool has a base configured to support a frame of the optical assembly. The frame is configured to hold one or more optical ferrule subassemblies. A plurality of teeth extend from the surface of the base. The teeth spaced apart from each other along a lateral axis of the base and have a pitch along the lateral axis that is equal to a pitch of the ferrule subassemblies of the frame.

Some embodiments involve an optical assembly that includes a frame configured to hold a plurality of ferrule subassemblies spaced apart from each other and disposed at least partially within an interior space of the frame. The frame has a base side extending from a mating end to an opposing non-mating end of the frame. Ferrule support features are spaced apart from each other along and proximate to a mating end of the frame. The ferrule support features are configured to support ferrules of optical ferrule subassemblies after the optical ferrule subassemblies are inserted into the frame and before mating with a mating optical assembly. The frame has holes in the base side spaced apart from each other along and proximate to the mating end of the frame. A pitch of the holes equal to a pitch of the ferrule support features.

A method of assembling ferrule subassemblies into a cassette involves inserting teeth of a ferrule installation tool into holes in a first side of the cassette. After inserting the teeth into the holes, optical ferrule subassemblies are placed into the cassette. Each optical ferrule subassembly has a ferrule attached to a first location of an optical waveguide and a cable retainer attached to a second location of an optical waveguide. Placement of each ferrule subassembly comprises positioning the ferrule in the cassette between adjacent pairs of teeth and positioning the cable retainer such that a side of the cable retainer engages with a surface extending from an inner surface of the cassette. Engagement of the cable retainer and the surface restricts motion of the cable retainer along a mating axis of the cassette.

According to some embodiments an assembly includes a frame configured to hold one or more optical ferrule subassemblies and a tool for installing multiple optical ferrule subassemblies into the frame. The frame includes a base side extending from a mating end to an opposing non-mating end of the frame. The base side has holes proximate the mating end and spaced apart from each other along the mating end. The installation tool comprises a base having a surface configured to support the frame. A plurality of teeth extend from the surface of the base and are spaced apart from each other along a lateral axis of the base. The teeth inserted into the holes in the frame.

BRIEF DESCRIPTION OF DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Embodiments described herein involve optical ferrules, optical assemblies, and optical connectors that include such optical ferrules. Optical ferrules used in many applications may be optically coupled to one waveguide or arrays of multiple parallel waveguides (typically 4, 8 or 12 or more parallel waveguides). The individual waveguides are typically made of glass with a protective buffer coating, and the parallel waveguides are enclosed by a jacket. Optical ferrules are useful for connecting optical waveguides to other optical waveguides or to optoelectronic components for in-line interconnects and/or printed circuit board (PCB) connections, e.g., backplane connections.

One type of ferrule is an expanded beam ferrule, in which light is coupled between waveguides in a beam that is larger in diameter than the core of an associated optical waveguide and typically somewhat less than the waveguide-to-waveguide pitch. The waveguides may comprise optical fibers, e.g., single-mode fibers for a single-mode communication system, or multi-mode fibers for a multi-mode communication system. These expanded beam optical ferrules can have non-contact optical coupling and can require reduced mechanical precision when compared with conventional optical ferrules.

Optical assemblies may include a cassette configured to hold one or more optical ferrule subassemblies that include an optical ferrule and at least one optical waveguide attached to the optical ferrule. The cassette can be a one-piece unit or a multi-piece unit. One or more cassettes can be mounted within a connector housing. A cassette may provide mechanical protection and/or mating alignment for optical ferrule subassemblies mounted within the cassette.

Some embodiments described herein are directed to an optical assembly that includes a cassette and at least one optical ferrule subassembly. The cassette may comprise a hermaphroditic structure, referred to herein as a hood, which extends beyond the ends of the ferrules disposed within the cassette, thus protecting the ends of the ferrules from impact and abrasion.

Figure 1A:
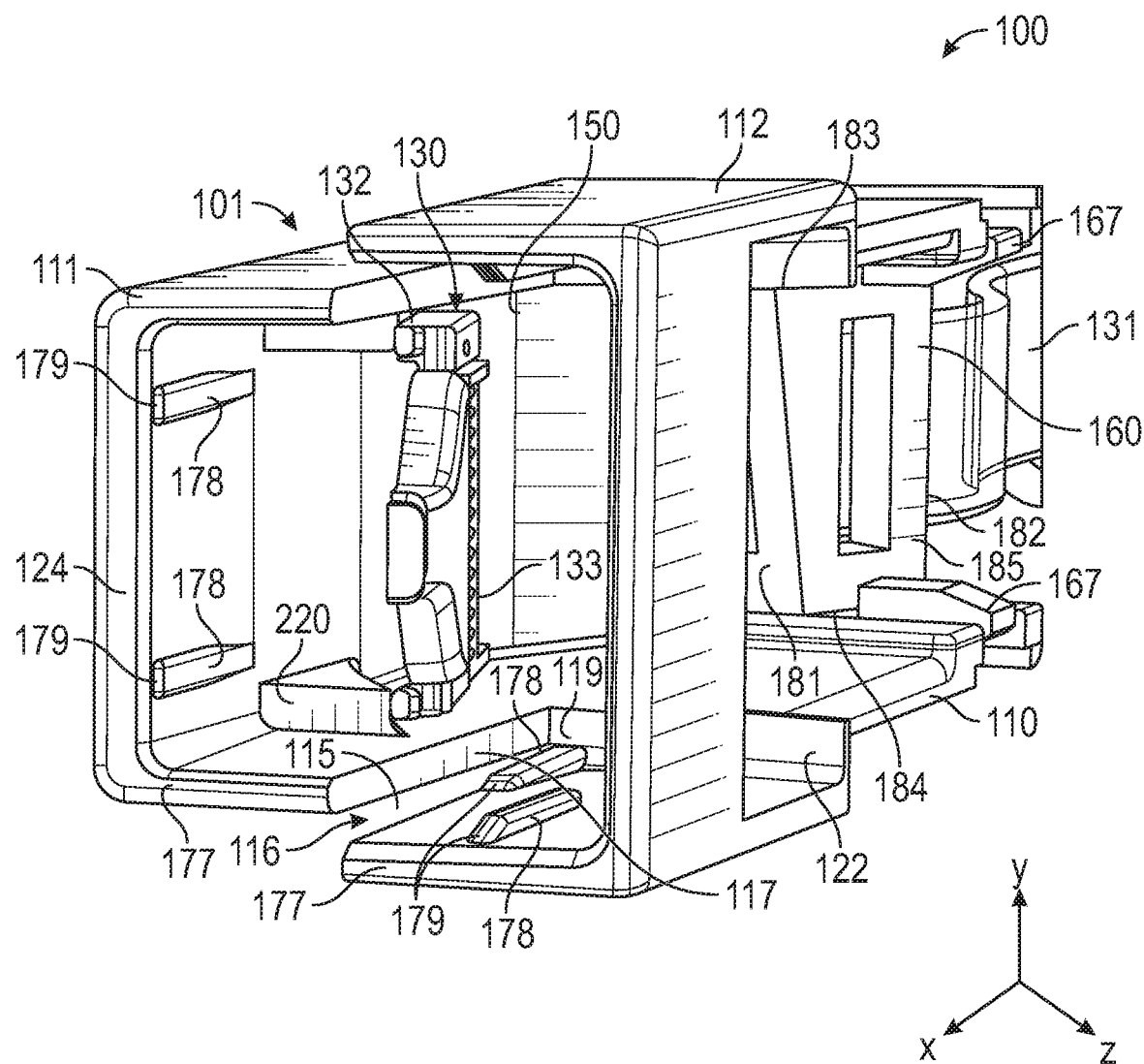
FIG. 1A is a perspective view of an optical assembly comprising a single piece cassette comprising a hood in accordance with some embodiments.
Figure 1B:
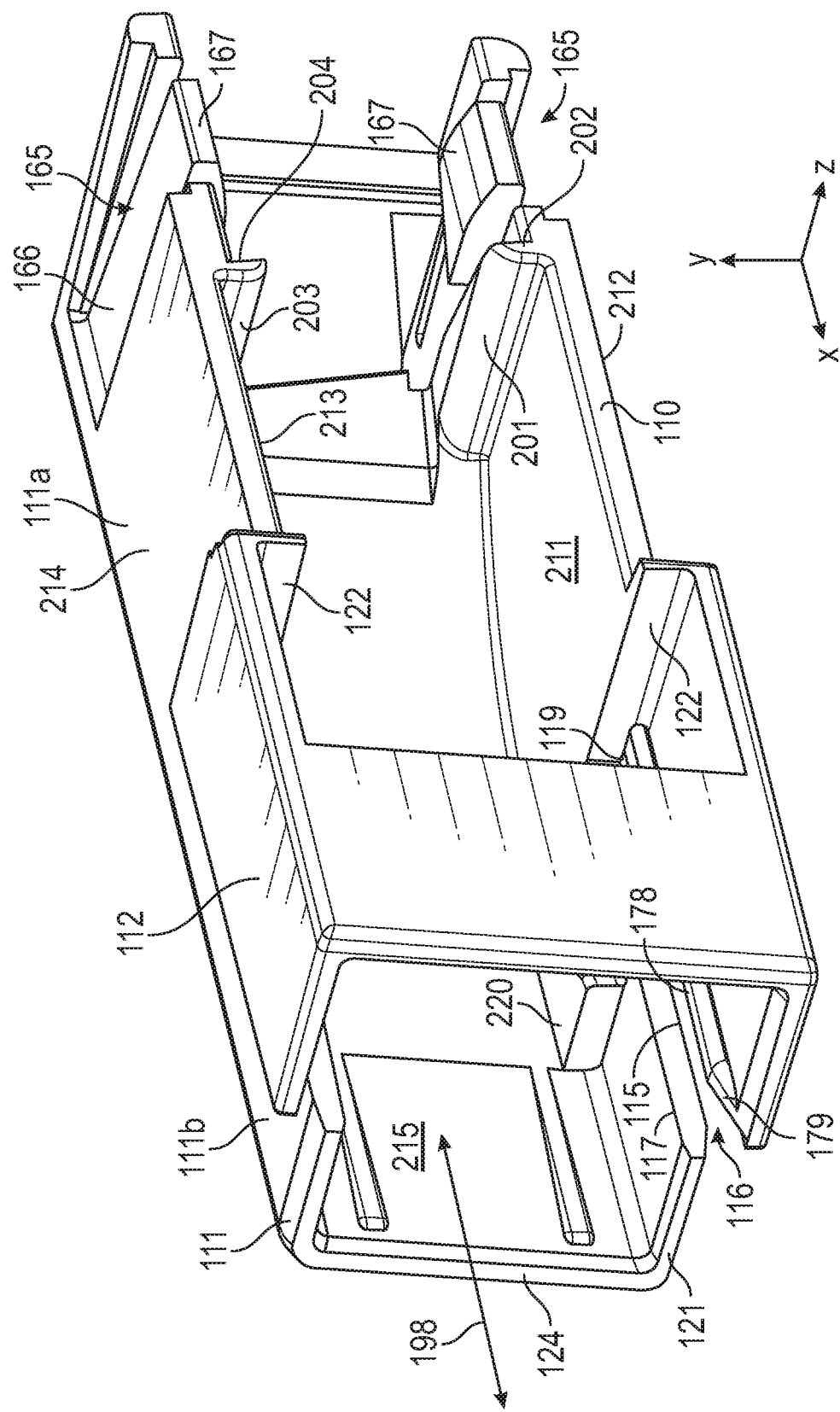
FIG. 1B is a perspective view of the hood of FIG. 1 absent the optical ferrule subassembly.
Figure 2:
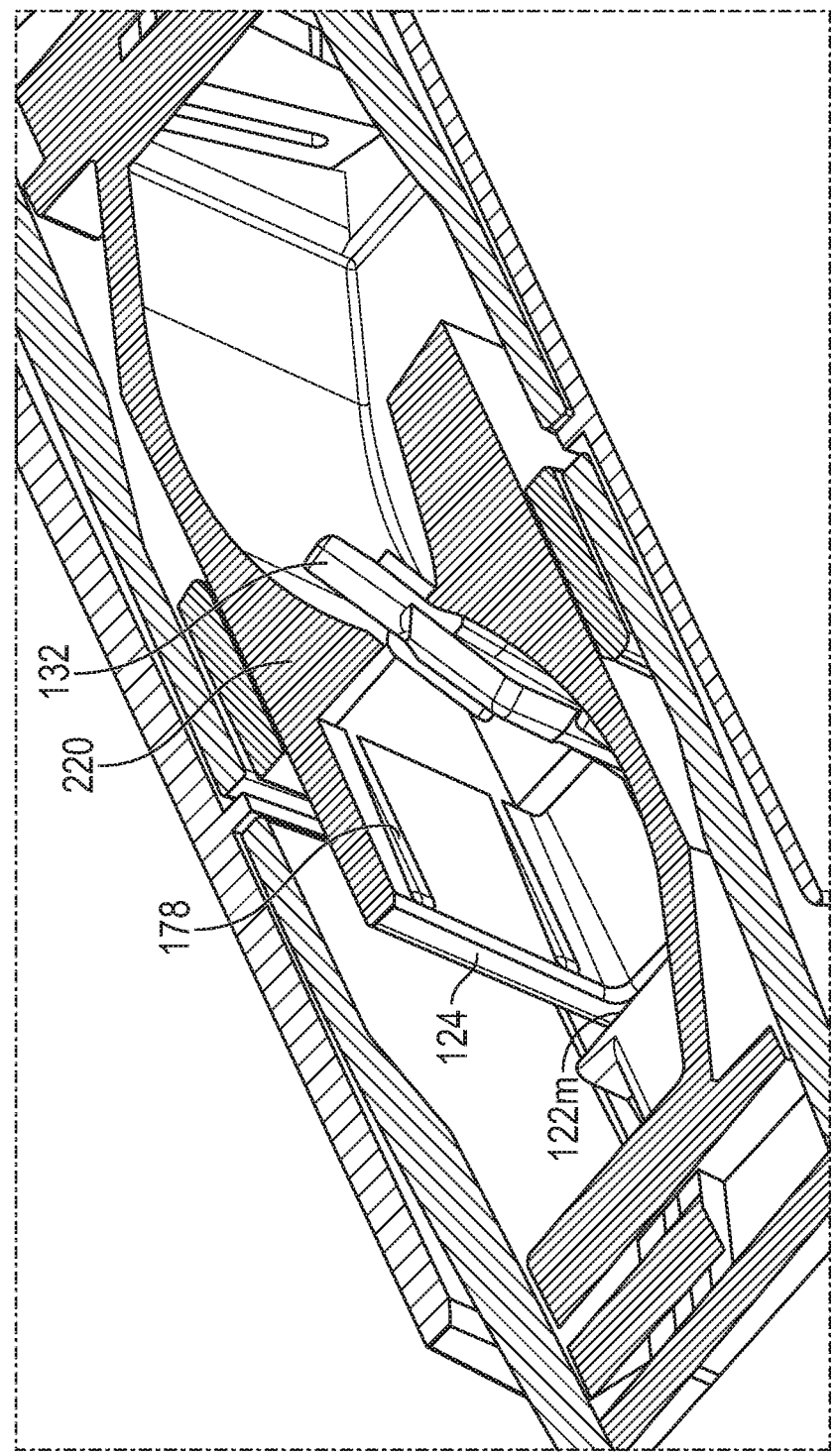
FIG. 2 is a perspective cut away view of the optical assembly of FIG. 1 after mating with a mating optical assembly.
Figure 3A:
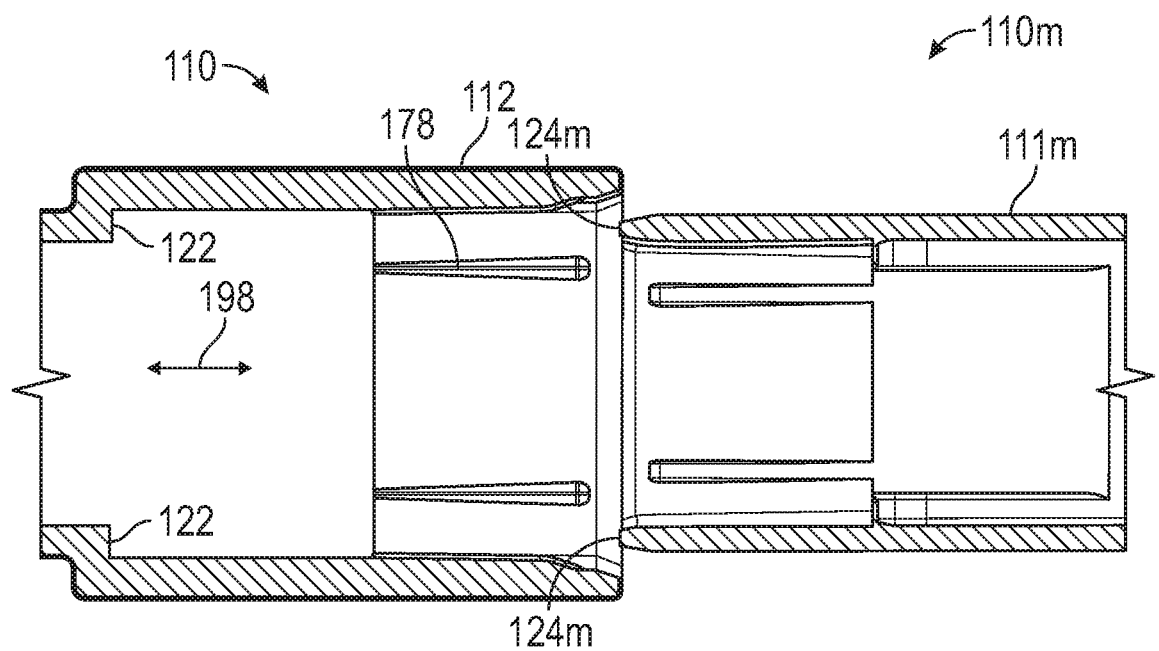
FIGS. 3A and 3B are cutaway views of the hood before (FIG. 3A) and after (FIG. 3B) mating.
Figure 3B:
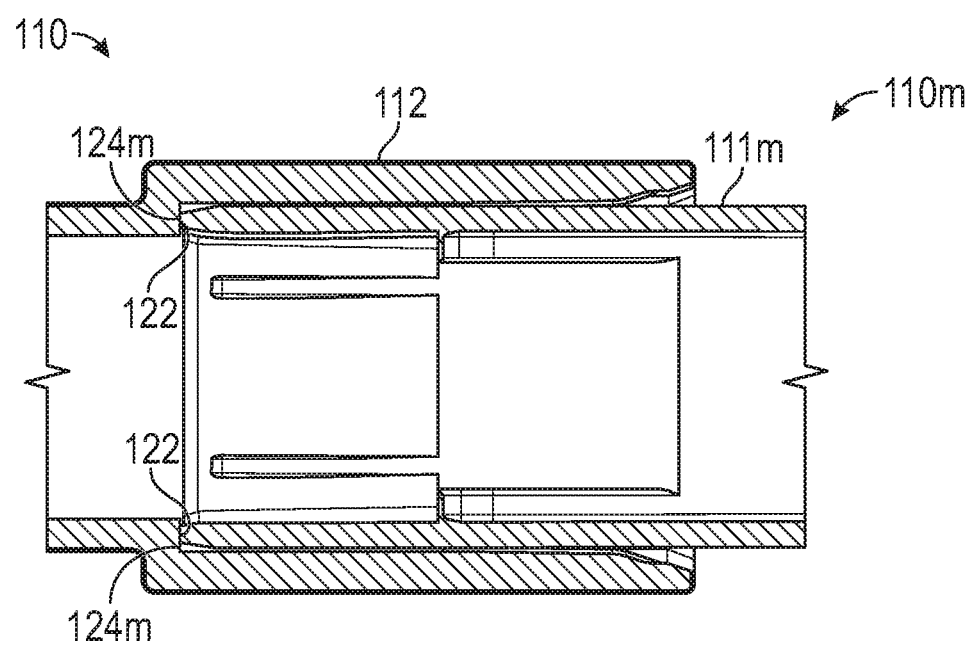

FIG. 1A is a perspective view of an optical assembly 100 including a single piece cassette 101 comprising a hood 110. An optical ferrule subassembly 130 is disposed within the hood 110. FIG. 1B is a perspective view of the hood 110 absent the optical ferrule subassembly. FIG. 2 is a perspective cut away view of the optical assembly 100 after mating with a mating optical assembly 100m. FIGS. 3A and 3B are cutaway views of the hood 110 before (FIG. 3A) and after (FIG. 3B) mating.

In the illustrated embodiments of FIGS. 1A through 3B, the single piece cassette 101 is a hood 110 that includes a narrower section 111 and a wider section 112. As depicted in FIG. 1B, in some embodiments a first portion 111a of the narrower section 111 extends beyond and behind the wider section 112 along the mating axis which is the x-axis in FIG. 1B. A second portion 111b of the narrower section 111 is configured to fit within the wider section of a mating hood. The hood 110 and a mating hood can be identical and hermaphroditic as shown in FIGS. 1B through 3B. As in FIGS. 3A and 3B, during mating, the wider section 112 of the hood 110 is configured to receive the second portion of the narrower section 111m of the mating hood 100m such that the narrower section 111m fits at least partially within the wider section 112.

As best seen in FIG. 1B, slots 115 are disposed between the narrower section 111 and the wider section 112 of the hood 110. At least a portion of the narrower section 111 is separated from at least a portion of the wider section 112 by first and second slots 115 disposed on opposing sides of the hood 110. Each of the first and second slots 115 has an opening 116 at a mating end 121 of the hood 110 and slot walls 117 that extend to an end 119 of the slot 115. During mating, the first and second slots 115 are configured to slidably engage with second and first slots of the mating hood, allowing the narrower section 111 of the hood 110 to slide within the wider section of the mating hood and allowing the narrower section of the mating hood to slide within the wider section 112 of the hood 110.

The hood 110 may include stop features 122, 124 configured to stop translational movement of the hood 100 along the mating axis 198 of the cassette 101 during mating with the mating hood 110m. The stop features stop the translational movement between the hood 110 and the mating hood 110m along the mating axis 198 before the ends 119 of the first and second slots 115 make contact with the ends of the second and first slots of the mating hood. A first stop feature 124 may comprise a mating end of the narrower section 111 and a second stop feature 122 may comprise a one or more stop surfaces disposed in the wider section of the hood. As shown in FIGS. 3A and 3B, the stop surfaces 122 of the wider section 112 engage with a mating end 124m of the narrow section 111m of the mating hood 110m and vice versa. First stop features 124, 124m can be designed to engage with second stop features 122m, 122 to stop the relative translational motion of the hood 110 and the mating hood 110m along the mating axis 198 before the slot ends 119 make contact with the slot ends of the mating hood. The stop features 122, 124 provide a fixed stop between the hood 110 and the mating hood 110m such that when the two hoods 110, 110m are fully nested within each other, as shown in FIG. 2 and FIG. 3B, the optical ferrules are correctly positioned relative to each other to provide the proper amount of overlap, providing a good optical connection.

Figure 4A:
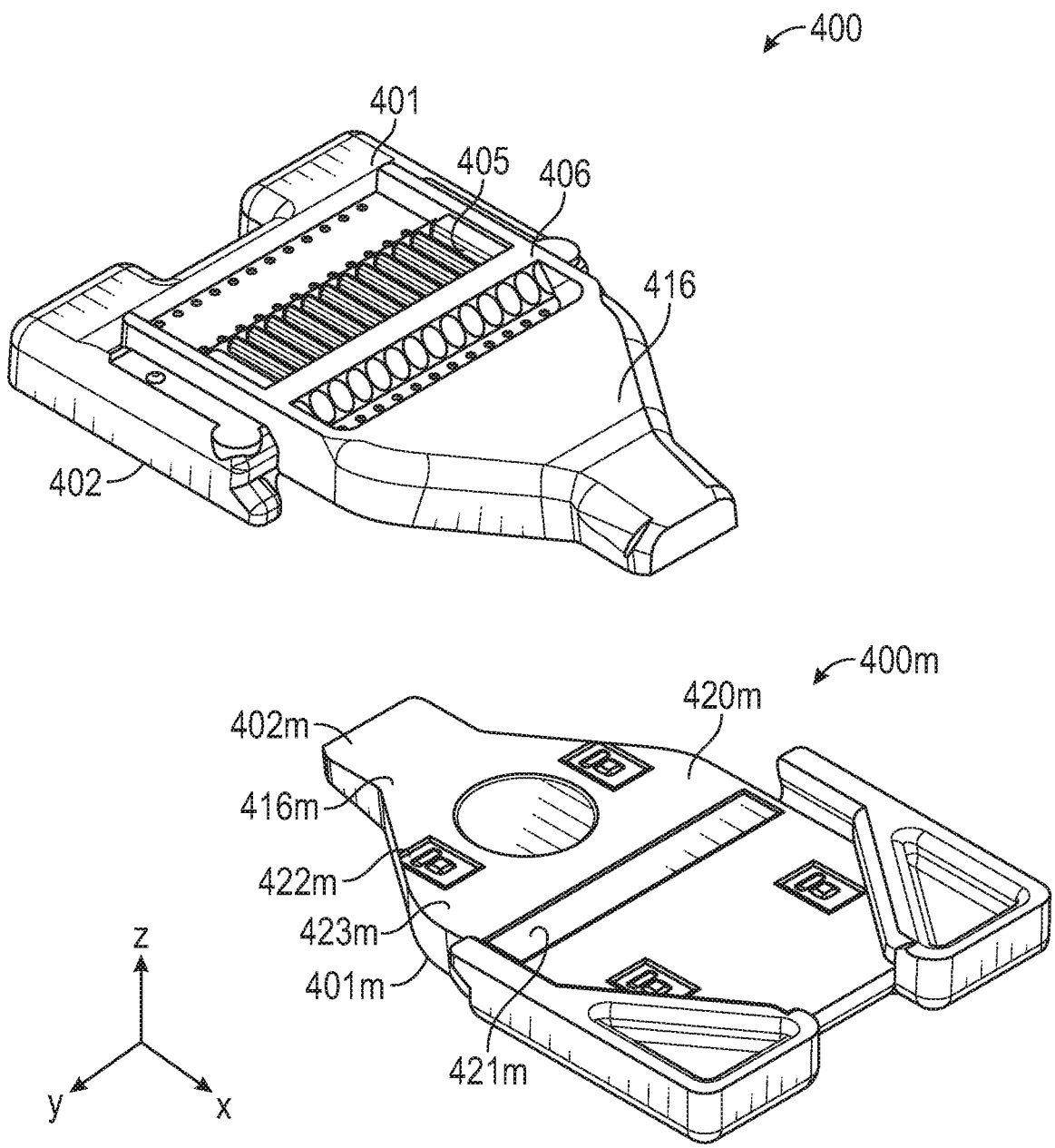
FIG. 4A shows an optical ferrule and identical mating optical ferrule suitable for use in an optical assembly that includes a cassette in accordance with some embodiments.
Figure 4B:
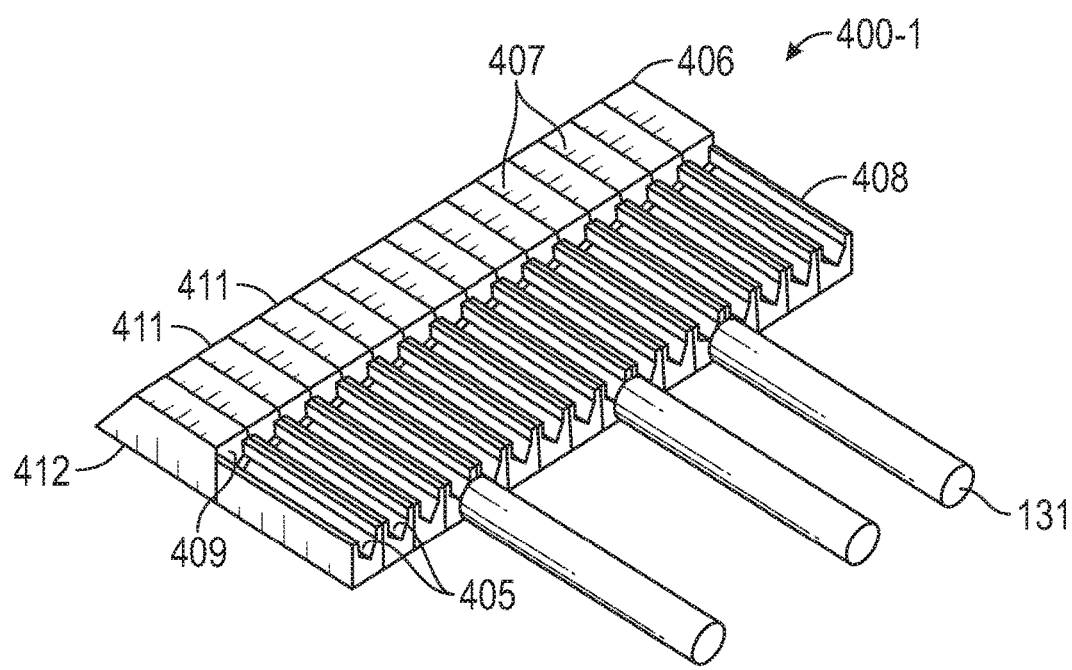
FIG. 4B is a cutaway view of a portion of optical ferrule focusing on the light redirecting member and attachment area in accordance with some embodiments.

FIG. 4A shows an optical ferrule 400 and identical mating optical ferrule 400m suitable for use in an optical assembly that includes a cassette as discussed herein. FIG. 4B is a cutaway view of a portion 400-1 of optical ferrule 400 focusing on the light redirecting member 406 and attachment area 408. FIG. 4A shows an optical ferrule 400 and mating optical ferrule 400m prior to mating. The optical ferrule 400, 400m comprises a first surface 401, 401m that includes one or more substantially parallel grooves 405 oriented for receiving one or more optical waveguides 131.

The first surface 401 also includes a light redirecting member 406 configured to be optically coupled to the optical waveguides 131. The term "optical waveguide" is used herein to refer to an optical element that propagates signal light. An optical waveguide comprises at least one core with a cladding, wherein the core and cladding are configured to propagate light within the core, e.g., by total internal reflection. An optical waveguide may be, for example, a single or multi-mode waveguide, a single core fiber, a multi-core optical fiber, or a polymeric waveguide. A waveguide may have any suitable cross sectional shape, e.g., circular, square, rectangular etc.

Each groove 405 is configured to receive a different optical waveguide 131 of the array of one or more optical waveguides. The optical waveguides 131 received by the grooves 405 can be permanently attached, e.g., using an adhesive, to the optical ferrule 400 at the grooves 405 which provide an attachment area 408 for the optical waveguides 131.

The optical ferrule 400 is configured to mate hermaphroditically with another optical ferrule 400m, which may be identical to the optical ferrule 400. The optical ferrules 400, 400m illustrated in FIG. 4A include a mechanical mating tongue 416, 416m. In some embodiments, the mechanical mating tongue 416, 416m can have a tapering width along at least a portion of a length of the tongue portion as shown in the illustrations. The mechanical mating tongue 416, 416m can extend outwardly from a cassette frame as discussed below.

FIG. 4B illustrates the attachment of several optical waveguides 131 to optical ferrule at the attachment area 408. Optical waveguides (optical fibers) 131 are aligned in grooves 405 to which they are permanently attached. The exit end of optical waveguides 131 is situated so as to be able to direct light emanating from the optical waveguide 131 into the input side or face of light redirecting member 406. Light redirecting member 406 includes an array of light redirecting elements 407, at least one for each of the optical waveguides (optical fibers) 131 attached to optical ferrule 400. For example, in various embodiments each light redirecting element 407 comprises one or more of a prism, a lens, and a reflecting surface.

At the point of attachment, the fiber buffer coating and protective jacket (if any) of the optical waveguide may be stripped away to allow only the bare optical fiber to lie aligned and permanently affixed to groove 405. Light redirecting element 407 includes light input side 409 for receiving input light from first optical waveguide 131 disposed in and aligned by the groove 405. Light redirecting element 407 also includes light redirecting side 411 that may include a curved surface for receiving light from the input side 409 along an input direction and redirecting the received light along a different redirected direction. The light redirecting element 407 also includes output side 412 that receives light from light redirecting side 411 of light redirecting element 407 and transmits the received light as output light along an output direction toward a light redirecting member of a mating light coupling unit.

Although FIGS. 4A and 4B show an optical ferrule 400 that includes multiple light redirecting elements 407 that can be optically coupled to multiple optical waveguides 131, it is also possible that an optical ferrule includes just one light redirecting element that can be optically coupled to a single optical waveguide.

The optical ferrule 400 and mating optical ferrule 400m have an opposing second surface 402, 402m that includes a mating surface 420m. The features of the second surface 402, 402m of the optical ferrule 400 are best understood with reference to the identical mating optical ferrule 400m shown in FIG. 4A. The mating surface 420m includes an optically transmitting window 421m for propagating an optical signal therethrough to an optically transmitting window of the optical ferrule. In some embodiments, the mating surface 420m of the optical may comprise a main portion 423m and one or more pads 422m that extend away from the main portion 423 along the thickness axis (z-axis). For example, in some configurations, the pads 422m may extend away from the main portion 423m of the mating surface 420m by about 5 μm to about 10 μm.

In some embodiments, the mating surface may not include pads. When present, the one or more pads 422m may collectively occupy less than a majority, e.g., less than 50%, less than 25%, or less than 10% of the surface area of the mating surface 420m. Alternatively, the pads 422m may individually or collectively occupy a substantial portion of the surface area of the mating surface, e.g., more than 10%, more than 25%, or even more than 50% of the surface area of the mating surface 420m.

In some embodiments, after mating, the pads of the mating optical ferrule rest on corresponding pads 422m of the mating optical ferrule 400m, providing a small gap between the main portions of the mating surfaces of the optical ferrule 400 and the mating optical ferrule 400m. The small gap accommodates dust and/or other irregularities that may be present between the main portion of the mating surface of the optical ferrule 400 and the main portion 423m of the mating surface 420m of the mating optical ferrule 400m.

In some embodiments, when the mating surface of the optical ferrule 400 and the mating surface 420m of the mating optical ferrule 400m do not include pads, the main portion of the mating surface of the optical ferrule 400 and the main portion 423m of the mating surface 420m of the mating optical ferrule 400m may be in contact after the optical ferrules 400, 400m are mated.

Additional information regarding features and operation of optical ferrules, optical ferrule subassemblies and optical connectors is discussed in concurrently filed and commonly owned U.S. patent application Ser. No. 62/691,871, entitled "Optical Ferrule having Compound Stops" which is incorporated herein by reference.

Figure 5:
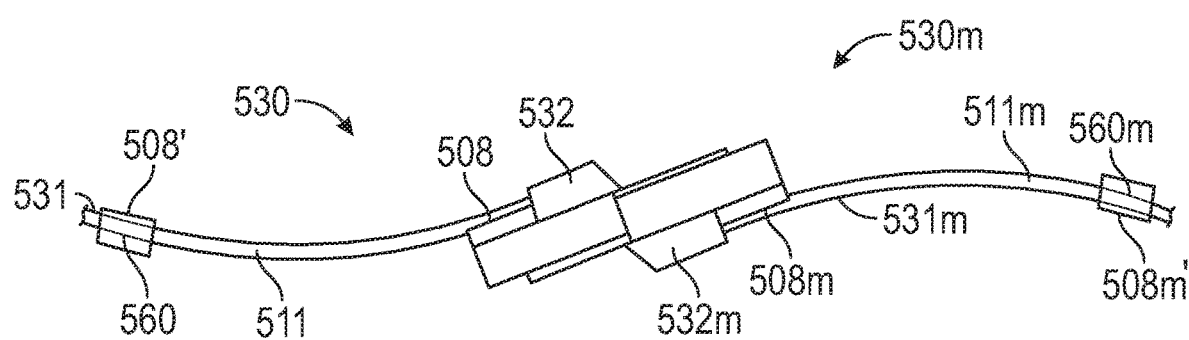
FIG. 5 illustrates two mated optical ferrule subassemblies in accordance with some embodiments.

FIG. 5 illustrates two mated optical ferrule subassemblies 530, 530m. The ferrule subassemblies 530, 530m comprise optical waveguides 531, 531m attached to optical ferrules 532, 532m at first attachment areas 508, 508m. The optical waveguide is attached to a cable retainer at a second attachment area 508', 508m'; the cable retainer is subsequently attached to the cassette. The length of the optical waveguides 531, 531m between the first attachment area 508, 508m of the optical ferrule 500, 500m, and the second attachment area 508', 508m' is configured to allow a bend 511, 511m to develop in the optical waveguides 531, 531m when the second attachment area 508', 508m' is secured within a cassette. The bend 511, 511m contributes to a predetermined mating spring force at a predetermined angle and location of the optical ferrule 532, 532m that holds the optical ferrule 532 and mating optical ferrule 532m in mating alignment and in optical communication in the mated position. In some embodiments, the second attachment area 508', 508m' may comprise a cable retainer 560, 560m attached to the waveguides 531, 531m. The cable retainer 560, 560m is configured to be received and secured by a retainer mount within the cassette such that the second attachment area 508', 508m' is secured within the cassette as discussed in more detail herein. Additional information regarding optical cable assemblies and housings that include cable retainers and mounts is described in commonly owned U.S. Patent Application Ser. 62/240,008, filed Oct. 12, 2015 which is incorporated herein by reference.

In some embodiments, the cable retainer may have two opposing sides that are non-parallel with each other. In some embodiments, the cable retainer may have two opposing sides wherein one of the sides is shorter than the other side. The sides of the cable retainer may be substantially straight, or one or more of the sides may be curved.

Figure 6:
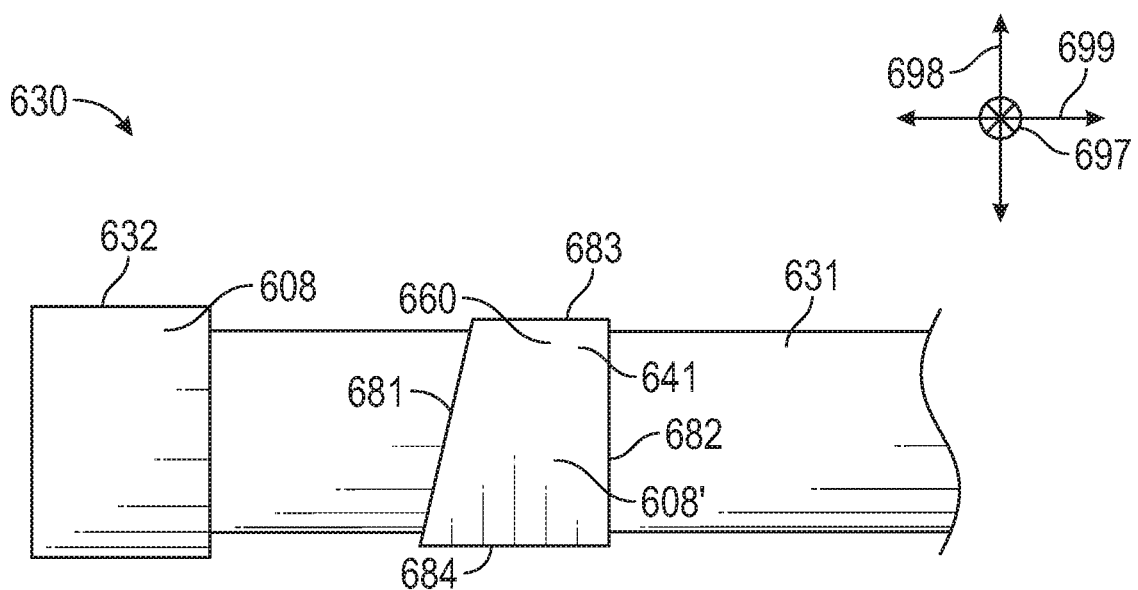
FIG. 6 is a top view of an optical ferrule subassembly comprising a trapezoidal cable retainer in accordance with some embodiments.

FIG. 6 is a top view of an optical ferrule subassembly 630 comprising a cable retainer 660 in accordance with some embodiments. The subassembly 630 includes at least one optical waveguide 631 and an optical ferrule 632 attached to the optical waveguide 631 at a first attachment location 608. The optical ferrule subassembly 630 includes a cable retainer 660 attached to the waveguide 631 at a second attachment location 608'. The cable retainer 660 has two opposing sides 683, 684 that are substantially parallel with each other and two opposing sides 681, 682 that are non-parallel with each other. The parallel sides 683, 684 are disposed along a longitudinal axis 699 of the optical waveguide 631 and the non-parallel sides 681, 682 are disposed laterally across the optical waveguide 631. Side 683 is shorter than side 684 and side 682 is shorter than 681. Surface 641 and an opposing surface (not shown) extend between sides 681, 682, 683, and 684. In the illustrated embodiment, the cable retainer 660 has a trapezoidal shape, although other shapes are also possible.

Figure 7:
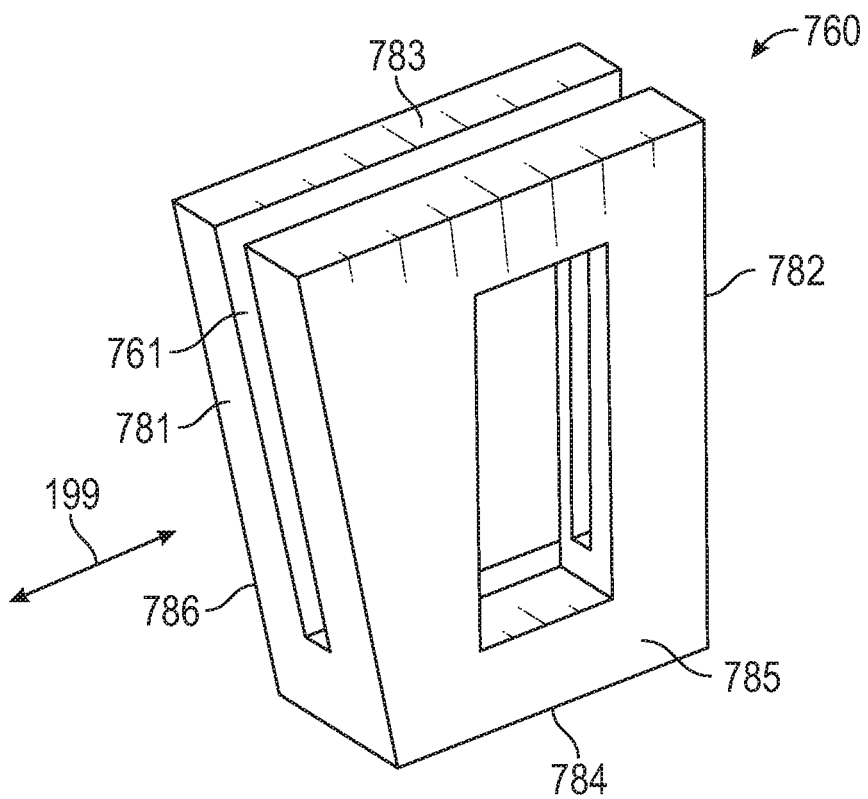
FIGS. 7 and 8 are perspective views that respectively illustrate two trapezoidal cable retainer configurations according to some embodiments.
Figure 8:
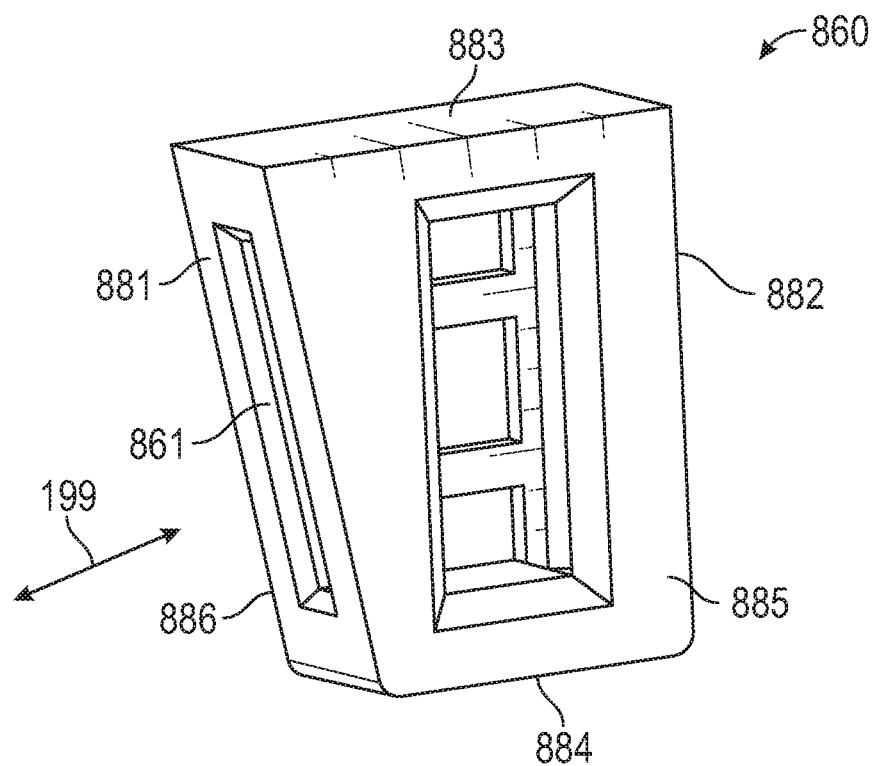

FIGS. 7 and 8 are perspective views that respectively illustrate two trapezoidal cable retainer configurations according to some embodiments. FIG. 7 shows a cable retainer 760 comprising two opposing surfaces 785, 786, two opposing sides 783, 784 that are substantially parallel with each other, and two opposing sides 781, 782 that are non-parallel with each other. The parallel sides 783, 784 are disposed along a longitudinal axis 199 of the optical waveguide, (not shown in FIG. 7). The non-parallel sides 781, 782 extend laterally across the optical waveguide. Openings in the non-parallel sides 781, 782 and one of the parallel sides 783 form a three sided slot 761 that extends through the cable retainer 760 along the axis 199 and is configured to receive the optical waveguide.

FIG. 8 shows a cable retainer 860 comprising two opposing surface 885, 886, two opposing sides 883, 884 that are substantially parallel with each other, and two opposing sides 881, 882 that are non-parallel with each other. The parallel sides 883, 884 are disposed along a longitudinal axis 199 of the optical waveguide (not shown in FIG. 8) and the non-parallel sides 881, 882 are disposed laterally across the optical waveguide. Openings in the non-parallel sides 881, 882 form a four sided slot 861 that extends through the cable retainer 860 along the axis 199 and is configured to receive the optical waveguide.

Referring again to FIGS. 1A and 1B, the hood 110 may include one or more flexible latching members 165 that form a cable retainer mount configured to hold the cable retainer 160 within the hood 110. Each flexible latching member 165 comprises an elongated flexible arm portion 166 and a finger portion 167 at the end of the arm portion 166. The flexible latching members 165 are configured to flex away from each other to receive the cable retainer 160, and to flex toward each other when the cable retainer 160 is disposed within the hood 110. When the cable retainer 160 is received by the latching member 165 within the hood each elongated flexible arm portion 166 extends along one of the parallel sides 183, 184 of the cable retainer 160 and the finger portion 167 extends along the surface 185 of the cable retainer 160. According to some implementations, the cable retainer 160 may be trapezoidal in shape as previously discussed in connection with FIGS. 7 and 8. The optical waveguide 131 runs through a slot in the cable retainer 160.

According to some implementations, the hood 110 includes a first protrusion 201 extending from an inner surface 211 of a first side 212 of the hood 110 as best seen in FIG. 1B. The first protrusion 201 has a first surface 202 arranged to engage with one of the non-parallel sides 181 of the cable retainer 160. According to some implementations, the hood 110 includes a second protrusion 203 extending from an inner surface 213 of an opposing second side 214 of the hood 110, the second protrusion 203 having a second surface 204 configured to engage the non-parallel side 181 of the cable retainer 160. The latching members 165 secure the cable retainer 160 within the hood 110 and prevent motion of the cable retainer 160 along the z-axis shown in FIG. 1B. Engagement of the side 181 of the cable retainer 160 with first and second surfaces 202, 204 of first and second protrusions 201, 203 limit movement of the cable retainer 160 along the x axis as shown in FIG. 1B.

In some embodiments, the hood 110 may include one or more curved alignment shoulders 220 within the hood 110 as shown, for example in FIGS. 1A, 1B, and 2. The curved alignment shoulders 220 are configured to support the optical ferrule 132 before the optical assembly 100 mates with a mating optical assembly. Once the two ferrules of the optical assembly 100 and the mating optical assembly come into contact, they nestle against each other, rising off curved alignment shoulders 220 within the hood 110 and providing a stable optical interconnect.

As shown in FIGS. 1A through 3B, the hood 110 may include one or more ribs 178 extending from the inner surfaces 211, 213, 215 of the hood 110 and running generally along axis 198 at a mating end 121 of the hood 110. The ribs 178 facilitate alignment of the hood 110 with the mating hood during mating. The lead-in edges 179 of the ribs 178 may be chamfered. Lead-in chamfered edges 177 at the mating end of the narrower 111 and/or wider 112 sections of the hood 110 and/or at the lead-in edges 179 of the ribs 178 can reduce sticking between the mating hoods during mating. The lead-in chamfers 177, 179 and ribs 178 can guide the alignment of the hoods 110, 110m during mating even if the initial positioning of the centerlines of the hoods 110, 110m is somewhat inaccurate.

Figure 9:
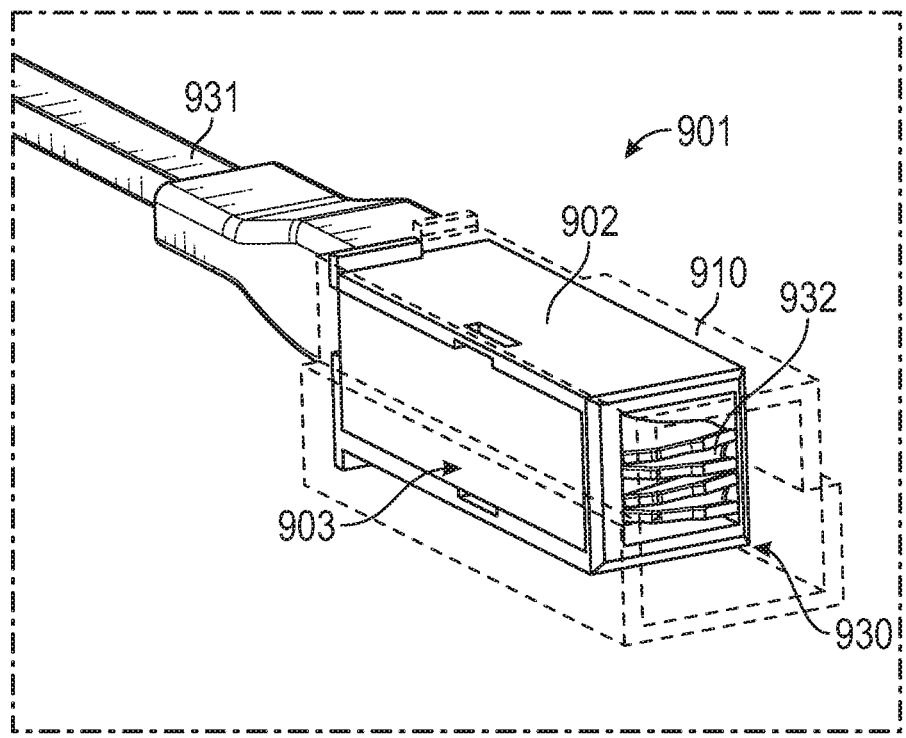
FIG. 9 provides a perspective view of an optical assembly comprising a multi-piece cassette in accordance with some embodiments.

FIG. 1A illustrates an optical assembly 100 comprising a single piece cassette 101 wherein the single piece is a hood 110. In other implementations, as illustrated in FIG. 9, a cassette 901 may be a multi-piece article. Cassette 901 includes a frame 902 disposed within a hood 910. One or more optical ferrule subassemblies 930 comprising at least an optical ferrule 932 and one or more optical waveguides 931 are disposed within the frame 902. The mating ends of the optical ferrules 932 may extend out of the frame 902 and the hood 910 may extend over the ends of the optical ferrules 932 to mechanically protect the ferrules 932 from impact and abrasion. The hood 910 includes a narrower section, a wider section, and slots such that the narrower section can slide within a wider section of a mating hood as previously discussed in connection with FIGS. 1A through 3B. The hood 910 may include stop features that stop the translational motion of the cassette along the mating axis during mating as discussed herein.

The one or more optical ferrule subassemblies 930 disposed within the frame 902 may be the same or similar to those previously discussed and may include a cable retainer. In some configurations, the frame 902 may include a retainer mount configured to receive and secure the cable retainer of the optical ferrule subassembly 930. Additional features of the frame of an optical assembly are discussed in connection with FIG. 11.

An optical connector can include one or more single or multi-piece cassettes having optical ferrule subassemblies disposed within the cassettes. The cassettes may be configured to be inserted into a single or a multi-piece connector housing. The cassette may be standardized across a broad range of optical connector configurations whereas the connector housing may be designed to be specific to a particular application. The use of standardized format cassettes that hold the optical ferrule subassemblies and can be inserted into housings having a number of different configurations simplifies manufacture of the optical connectors.

Assembly of an optical connector can involve loading optical ferrule subassemblies (optical ferrule and cable retainer attached to an optical waveguide) into a cassette. In the example of the cassette 101 illustrated in FIG. 1A, the optical ferrule subassembly 130 is loaded from the "bottom" of the hood 110 which is shown at the right side of the page in FIG. 1A). Installation of the optical ferrule subassembly involves resting the optical ferrule 132 on the curved alignment shoulders 220 and bending the optical waveguide 131 while pressing the cable retainer 160 into the flexible arms 166 of the retainer mount 165. With reference to FIG. 6, an optical ferrule subassembly has a longitudinal axis 699, a lateral axis 698, and a thickness axis 697. In the embodiment illustrated in FIG. 1A, the optical ferrule subassembly 130 is inserted into the hood 110 generally along the thickness axis of the optical ferrule subassembly.

The frame 902 has a removable cover 903. In the example cassette 901 of FIG. 9, the cover 903 is removed and the optical ferrule assemblies are loaded into the frame 902 of the cassette 901 from the left "side" shown in FIG. 9. Referring back to FIG. 6, which discusses the axes of an optical ferrule subassembly, the optical ferrule subassembly 932 is inserted into the frame generally along the lateral axis 698 of the optical ferrule subassembly. After the optical ferrule subassemblies are loaded into the frame 902, the frame 902 with the optical ferrule subassemblies installed therein is inserted into the hood 903.

Installing the optical ferrule subassemblies from the side along the lateral axis of the ferrule subassemblies involves resting the ferrule on the curved alignment shoulders at the mating end of the cassette while bending the waveguide and inserting the cable retainer into a retainer mount in the cassette. However, loading multiple optical ferrule subassemblies from the side can be challenging because, for example, the optical ferrule can be accidently moved too far forward or backward such that it falls off the curved alignment shoulders. Some embodiments are directed to a ferrule installation tool that facilitates installation of the optical ferrule subassemblies into the frame of the cassettes. The tool assists the assembler in locating the ferrule on the correct set of alignment shoulders within the frame and holding the ferrule in place while the cable retainer is placed into the retainer mount.

Figure 10:
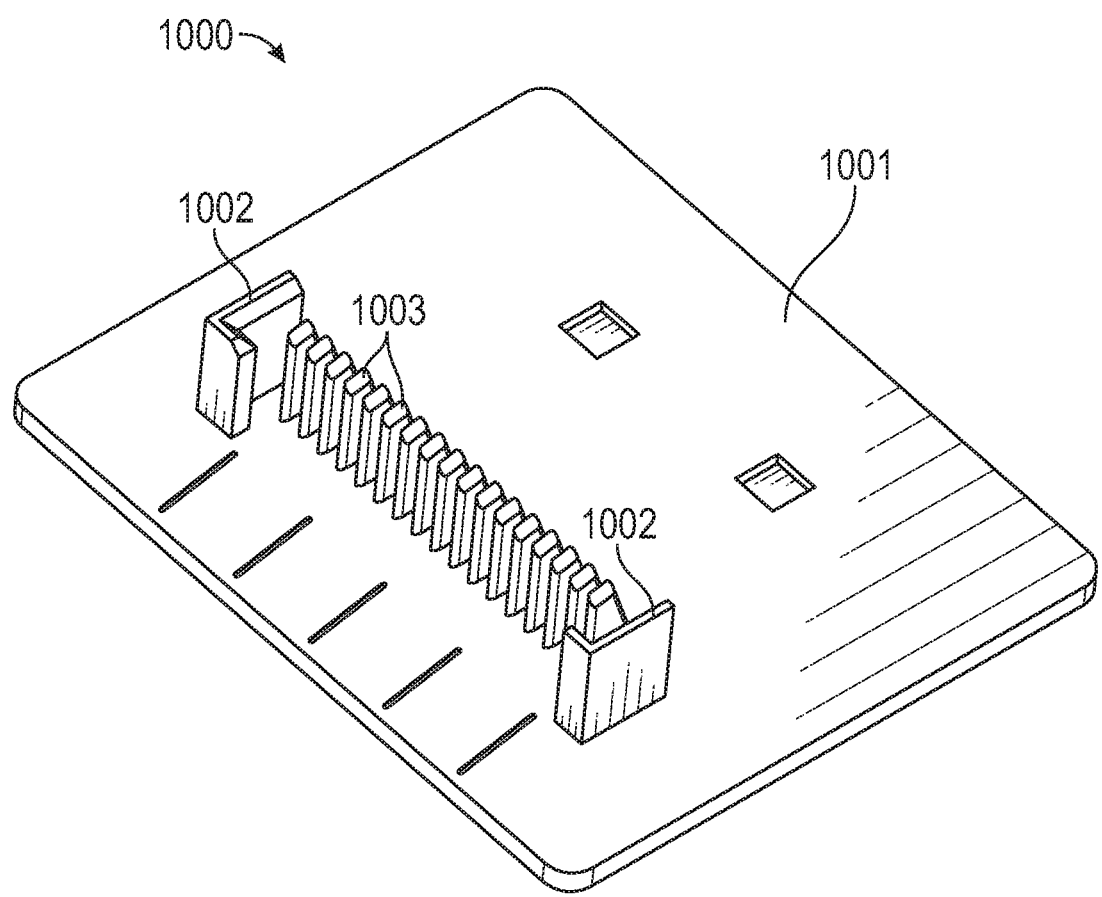
FIG. 10 is a perspective view of a ferrule installation tool in accordance with some embodiments.

FIG. 10 illustrates a ferrule installation tool 1000 in accordance with some embodiments. The ferrule installation tool 1000 includes a substantially flat base 1001 and optionally includes first and second corner supports 1002 extending from the surface of the base 1001. For example, in some configurations the corner supports 1002 can be L-shaped as shown in FIG. 10. The corner supports 1002 are spaced apart by a distance that allows the mating end of a frame of a cassette to be inserted between the first and second corner supports 1002. A plurality of teeth 1003 extend from the surface of the base 1001. The teeth 1003 are spaced apart from each other on the base between the corner supports 1002. The pitch of the teeth 1003 is equal to the pitch of the optical ferrule subassemblies when they are installed in the frame. As illustrated in FIG. 10, in some configurations, the bottom of each tooth 1003 where the tooth 1003 is attached to the base 1001 may be wider than the tip of the tooth 1003.

Figure 11:
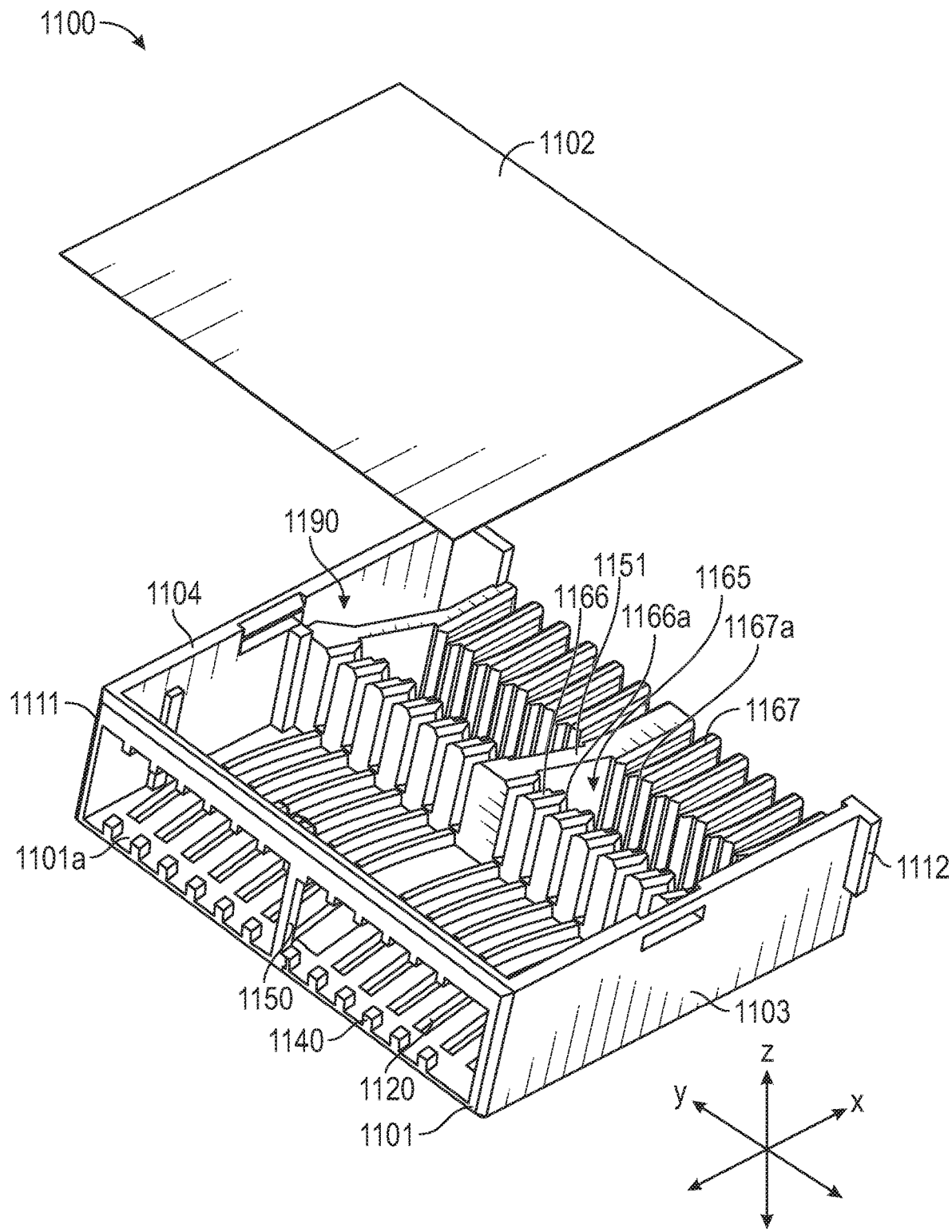
FIG. 11 is an exploded illustration of a frame of a cassette that is suitable for being loaded with optical ferrule subassemblies using the ferrule installation tool of FIG. 10.

A frame 1100 suitable for being loaded with optical ferrule subassemblies using the ferrule installation tool 1000 shown in FIG. 10 is illustrated in the exploded view of FIG. 11. The frame 1100 has a first side 1101 extending between the mating end 1111 and the non-mating end 1112 of the frame 1100. Frame 1100 has a second side 1102 that includes a removable cover, the second side 1102 opposing the first side 1101. The second side 1102 extends between the mating end 1111 and the non-mating end 1112 of the frame 1100. Third 1103 and opposing fourth 1104 sides extend between the mating end 1111 and the non-mating end 1112 of the frame 1100 and between the first 1101 and second 1102 sides. The first 1101, second 1102, third 1103, and fourth 1104 sides define an interior space 1190 of the frame 1100 into which the optical ferrule subassemblies are inserted. The frame 1100 includes holes 1120 through the first side 1101 proximate the mating end 1111. The holes 1120 are spaced apart from each other between the third 1103 and fourth 1104 sides.

The frame 1100 is configured to hold a plurality of optical ferrule subassemblies 1230 (not shown in FIG. 11 but shown in FIG. 12A—12C) that are spaced apart from each other and disposed at least partially within the interior space 1190 of the frame 1100. Each optical ferrule subassembly 1230 includes at least one optical waveguide 1231, an optical ferrule 1232 attached to the optical waveguide 1231 at a first location 1208 of the optical waveguide 1231, and a cable retainer 1260 attached to the optical waveguide 1208' at a second location of the optical waveguide 1231. After they are loaded into the frame 1100, the ferrule subassemblies 1230 are spaced apart within the interior space 1190 of the frame 1100 at a pitch that is equal to a pitch of the spaced apart holes 1120 in the first 1101 side of the frame 1100.

The frame 1100 includes retainer mounts 1165 configured to secure the cable retainers 1160 of the optical ferrule 1130 subassembly within the frame 1100. Each retainer mount comprises first and second walls 1166, 1167 extending from the inner surface 1101a of the first side 1101 of the frame 1100. The walls 1166, 1167 have first and second surfaces 1166a, 1167a that face each other. The inner surface 1166a of wall 1166 may be oriented at a non-perpendicular angle with respect to the x-axis which is the mating axis of the frame 1100. For example, the angle of the surface 1166a may be about 70 degrees to about 85 degrees or about 80 degrees with respect to the x-axis. The inner surface 1167a of wall 1167 may be oriented substantially perpendicular to the x-axis.

The frame 1100 may include ferrule support 1140, such as the curved alignment shoulders previously discussed, or other features that support the ferrules 1232 prior to mating. A frame 1100 that is configured to hold multiple optical ferrule subassemblies may also include at least one support brace 1150 and/or a rib 1151. The support brace 1150 extends between the first 1101 and second sides 1102 of the frame 1100 and reduces flexing of the frame 1100 at the mating end 1111. The brace 1150 may be positioned at about the mid-point of the mating end 1111, such that half of the optical ferrule subassemblies 1130 (e.g., 4, 5, 6, 7, 8 or more) are inserted on one side of the support bar 1150 and the other half of the optical ferrule subassemblies 1130 are inserted on another side of the support bar 1150. The support rib 1151 is disposed behind the support brace 1150 in the location of the retainer mounts 1165.

Figure 12A:
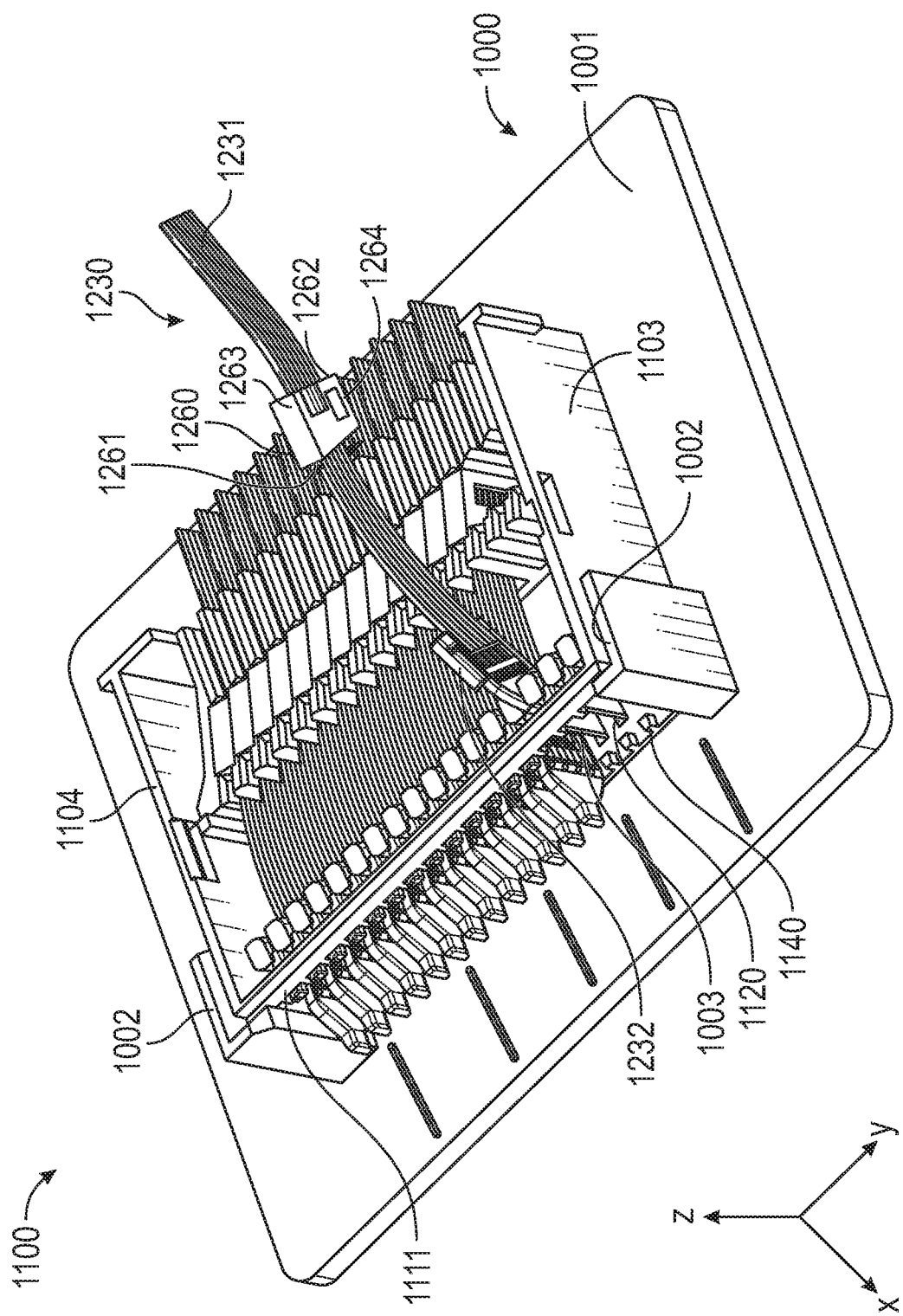
FIGS. 12A through 12D illustrate a process of loading optical ferrule subassemblies into a frame of a cassette in accordance with some embodiments.
Figure 12B:
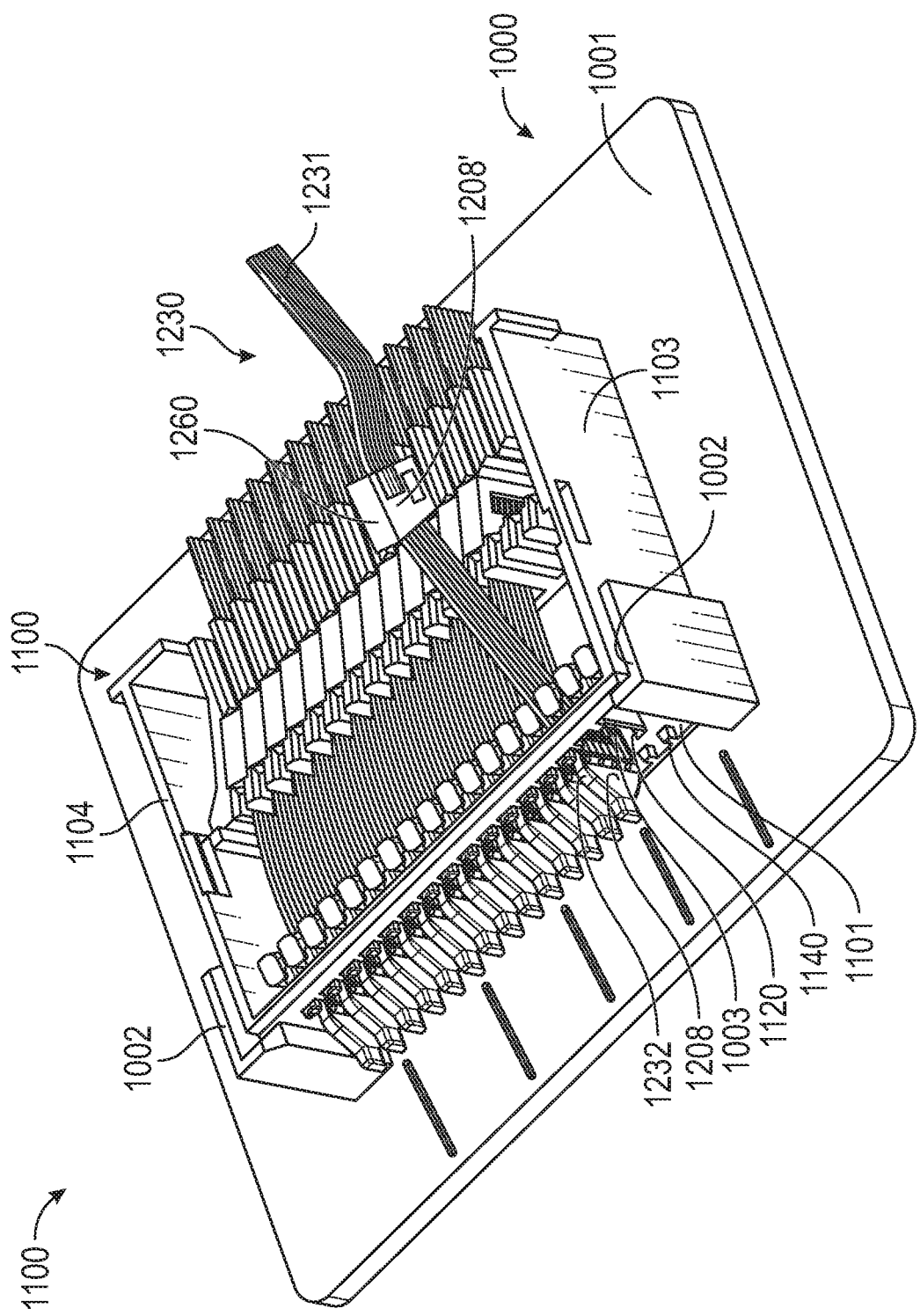
Figure 12C:
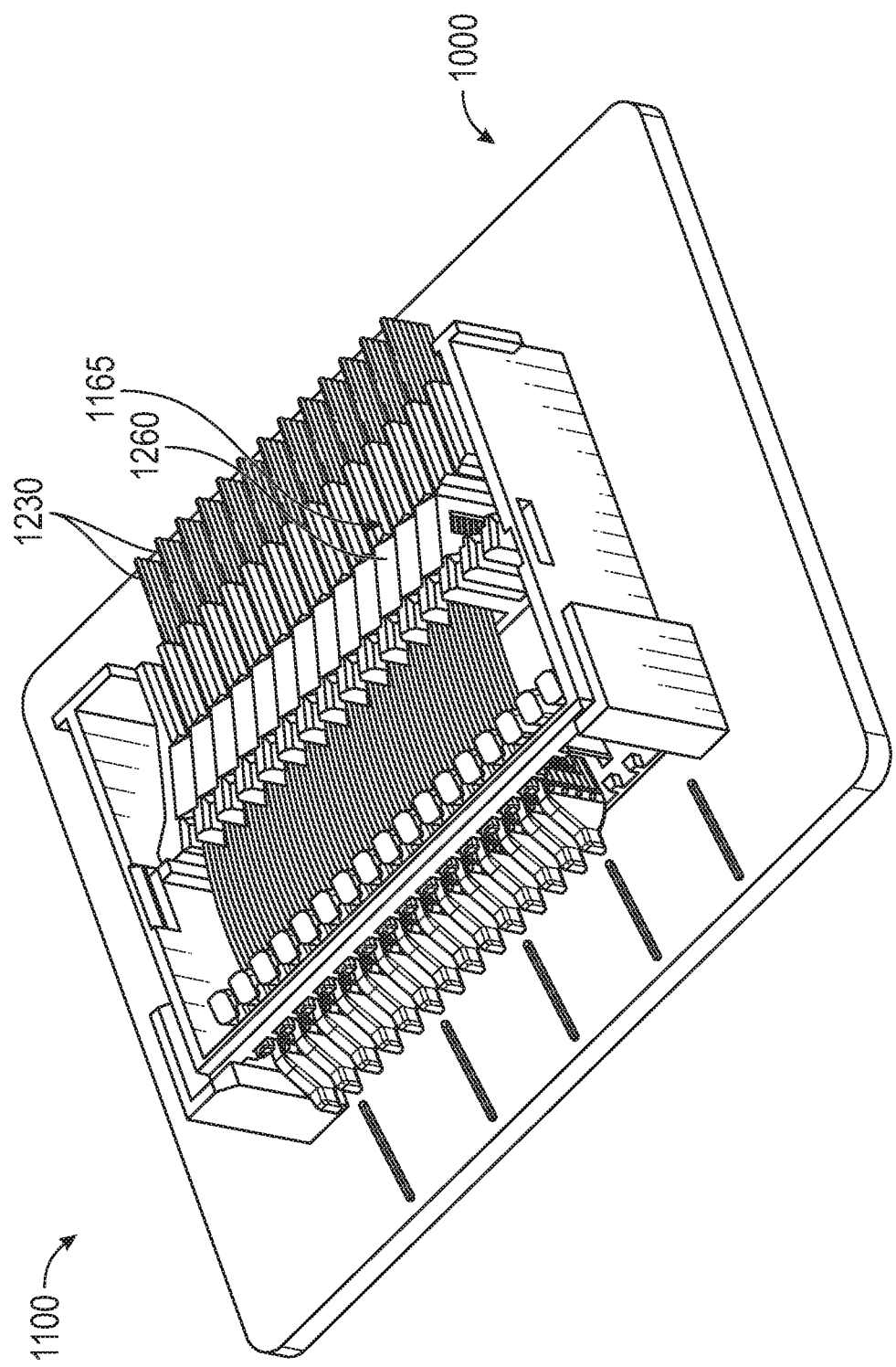

FIGS. 12A through 12C illustrate the process of loading a frame 1100 with optical ferrule subassemblies 1230 using the ferrule installation tool 1000 in accordance with some embodiments. The process initially involves inserting the teeth 1003 of the ferrule installation tool 1000 into the holes 1120 in the first side 1101 of the cassette frame 1100. The base 1001 of the ferrule installation tool 1000 supports the first side 1101 of the cassette frame 1100.

The frame 1100 is positioned between the first and second L-shaped corner supports 1002 of the ferrule installation tool 1000. The third 1103 and fourth 1104 sides of the frame 1100 are adjacent to the long side of the L-shaped corner supports 1002 and the mating edge 1111 of the frame 1100 is adjacent to the short side of the corner supports 1002. With the third and fourth 1103, 1104 sides of the frame adjacent the long sides of the corner supports 1002 and the mating edge 1111 of the frame 1100 adjacent to the short sides of the corner supports 1002, lateral translational motion of the frame 1100 along the y axis and forward motion along the x axis is restricted by the corner supports 1002.

After positioning frame 1100 in the installation tool 1000, the optical ferrule subassemblies 1230 are then placed into the frame 1100. In FIG. 12A, the frame 1100 has been placed into the installation tool 1000. A ferrule 1232 of at least one optical ferrule subassembly 1230 is positioned between adjacent sets of teeth 1003 of the ferrule installation tool 1000 and is placed on the ferrule support features 1140 which extend from the inner surface of the first side 1101 of the frame 1100. In some implementations, the ferrule support features 1140 may comprise the curved alignment shoulders discussed previously.

As illustrated in FIG. 12A, the ferrule 1232 is inserted into the frame 1100 before insertion of the cable retainer 1260 into the frame 1100. After the ferrule 1232 is inserted between the teeth 1003 and onto the support features 1140 of the frame 1100, the cable retainer 1260 is inserted between the walls 1166, 1167 of the frame's retainer mount 1165.

The cable retainer 1260 may have a trapezoidal shape as illustrated in FIGS. 7 and 8. In many embodiments, the retainer mount has about the same shape as the cable retainer. Trapezoidal cable retainers have a long side 1263 that is substantially parallel to a short side 1264. As illustrated in FIG. 12B, in implementations that include a trapezoidal cable retainer 1260, the short side 1264 is inserted between the walls 1166, 1167 of the retainer mount 1165 before the long side 1263. Positioning the cable retainer 1260 can involve rotating the optical ferrule subassembly 1230 around the y-axis which is substantially perpendicular with the mating axis (x-axis) of the frame 1160.

As the cable retainer 1260 is installed in the retainer mount 1166, the non-parallel sides 1261, 1262 of the cable retainer 1260 engage the surfaces 1166a, 1167a of the walls 1166, 1167. Inserting the short side 1264 of the trapezoidal cable retainer 1260 first before inserting the long side 1263 eases insertion of the cable retainer 1260 into the retainer mount 1165. Insertion of the cable retainer 1260 into the retainer mount 1165 forms a bend in the optical waveguide 1231.

Figure 14A:
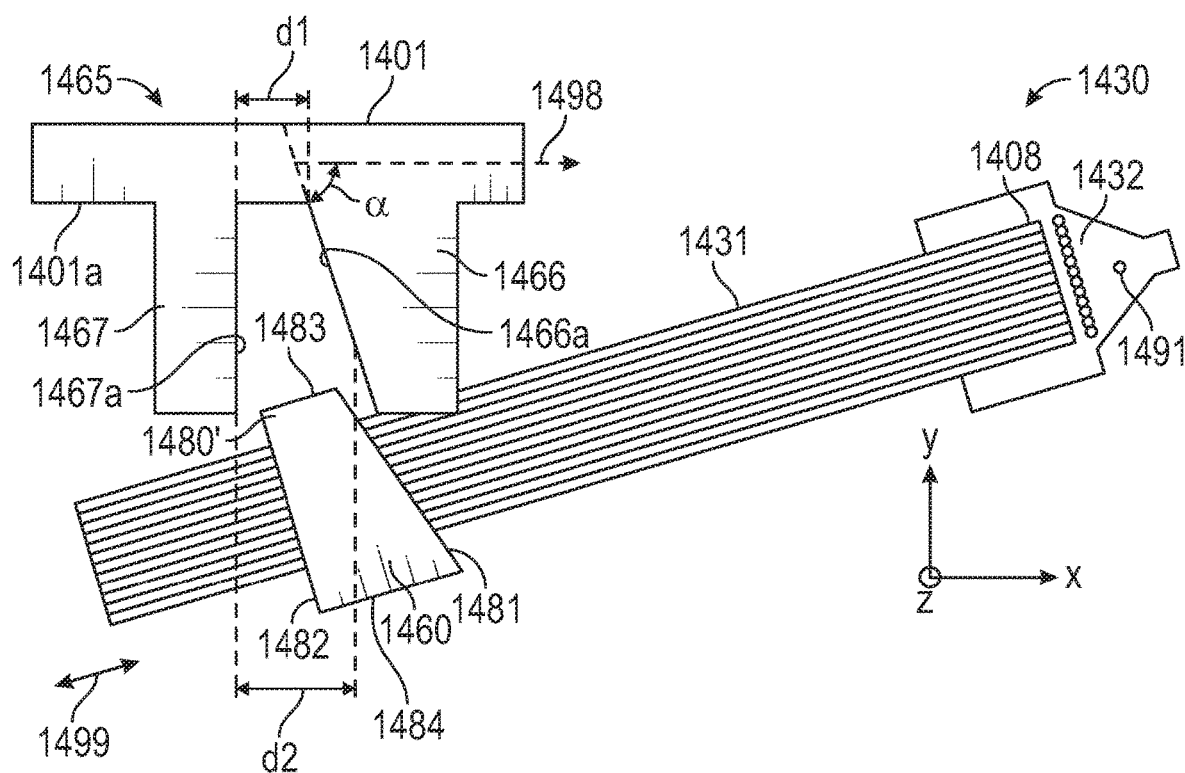
FIGS. 14A and 14B illustrate insertion of a trapezoidal cable retainer of an optical ferrule subassembly into a retainer mount in accordance with some embodiments.

FIGS. 14A through 15B illustrate in more detail insertion of a cable retainer 1460 of an optical ferrule subassembly 1430 into a retainer mount 1465. FIG. 14A shows an optical ferrule subassembly 1430 comprising an optical ferrule 1432 attached to optical waveguides 1431 at a first attachment location 1408. A cable retainer 1460 is attached to the optical waveguides 1431 at a second attachment location 1408'. In the illustrated embodiment, the cable retainer 1460 has a trapezoidal shape. The cable retainer 1460 has first and second 1481, 1482 opposing sides that are non-parallel to each other and third and fourth opposing sides 1483, 1484 that are substantially parallel to one another. First and second sides 1481, 1482 extend laterally across the optical waveguides 1431. Third and fourth sides 1483, 1484 extend along the longitudinal axis 1499 of the waveguide 1431. As depicted in FIGS. 14A and 14B, the sides 1481, 1482, 1483, 1484 of the cable retainer 1460 are substantially straight in this embodiment. Side 1483 is shorter than side 1484 and side 1482 is shorter than 1481.

The retainer mount 1465 includes first and second walls 1466, 1467 that extend from an inner surface 1401a of the side 1401 of the frame. The first wall 1466 has a first surface 1466a and the second wall 1467 has a second surface 1467a that faces the first surface 1466a. The first surface 1466a is oriented at a non-perpendicular angle, a, with respect to the mating axis 1498 of the frame (x-axis in FIGS. 14A and 14B) wherein a is sufficient to allow insertion of the cable retainer 1460 into the retainer mount 1465 by rotating the optical ferrule subassembly 1430 around a rotation point 1491 located on or near the optical ferrule 1432. For example a may be between about 70 degrees to about 85 degrees or about 80 degrees with respect to the mating axis 1498 of the frame. The second surface 1467a is oriented about perpendicular with respect to the mating axis 1498. To facilitate rotational insertion of the cable retainer 1460 into the retainer mount 1465, the first distance d1 between the first surface 1466a and the second surface 1467a at a location nearer to the inner surface 1401a of the frame side 1401 is smaller than a second distance d2 at a location farther from the inner surface 1401a of the frame side 1401. For example, d1 may be at the bottom surface of the retainer mount 1465 (at the inner surface 1401a of the frame side 1401) and d2 may be at the top surface of the retainer mount 1465.

Figure 14B:
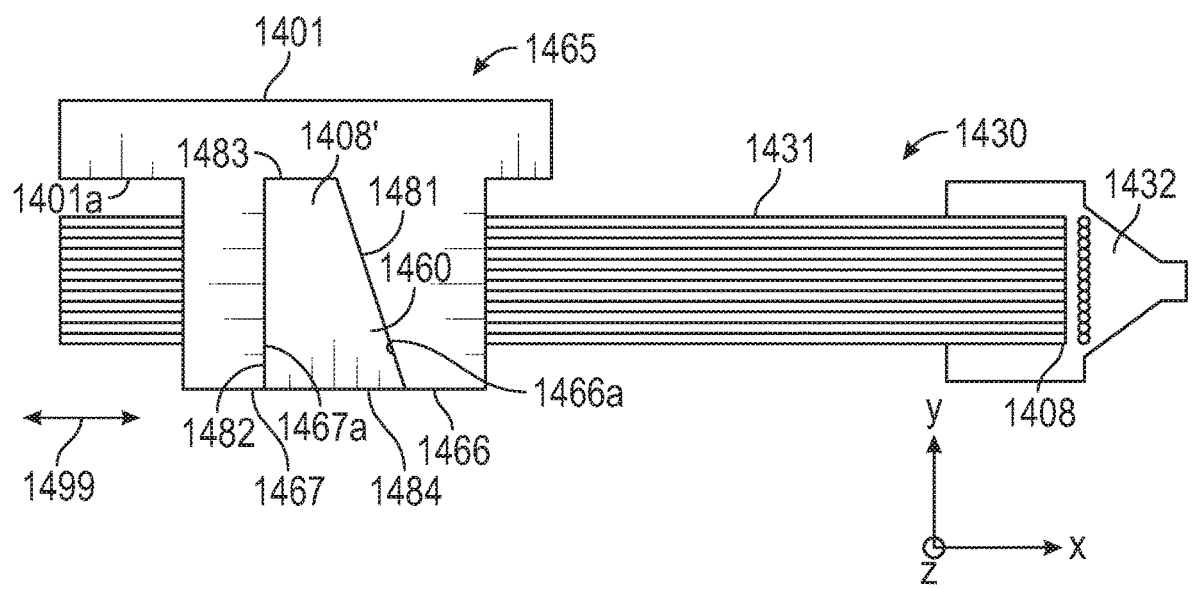

As illustrated in FIGS. 14A and 14B, installation of the cable retainer 1460 into the retainer mount 1465 involves rotating the optical ferrule subassembly 1430 around the z axis which is perpendicular to the mating axis 1498 wherein the point of rotation 1491 is located on or proximate to the ferrule 1432. The smaller of the parallel sides 1483 of the cable retainer 1460 is inserted into the retainer mount 1465 first, and the optical cable subassembly 1430 is rotated until the cable retainer 1460 is disposed within the retainer mount 1465. When fully inserted, the first surface 1466a of the retainer mount 1465 is adjacent to the non-parallel side 1481 that is disposed laterally across the waveguides 1431 at a non-perpendicular angle with respect to the longitudinal axis 1499 of the waveguides 1431. The second surface 1467a of the retainer mount 1465, which is behind the first surface 1466a along the mating axis 1498, is adjacent to the non-parallel side 1482 that is substantially perpendicular to the longitudinal axis 1499 of the waveguide 1431. FIG. 14B shows the cable retainer 1460 after it is fully installed in the retainer mount 1465. Insertion of the cable retainer 1460 into the retainer mount 1465 prevents movement of the cable retainer 1460 along the mating axis 1498 and secures the second attachment area 1408' of the optical waveguide 1431 within the frame.

Figure 15A:
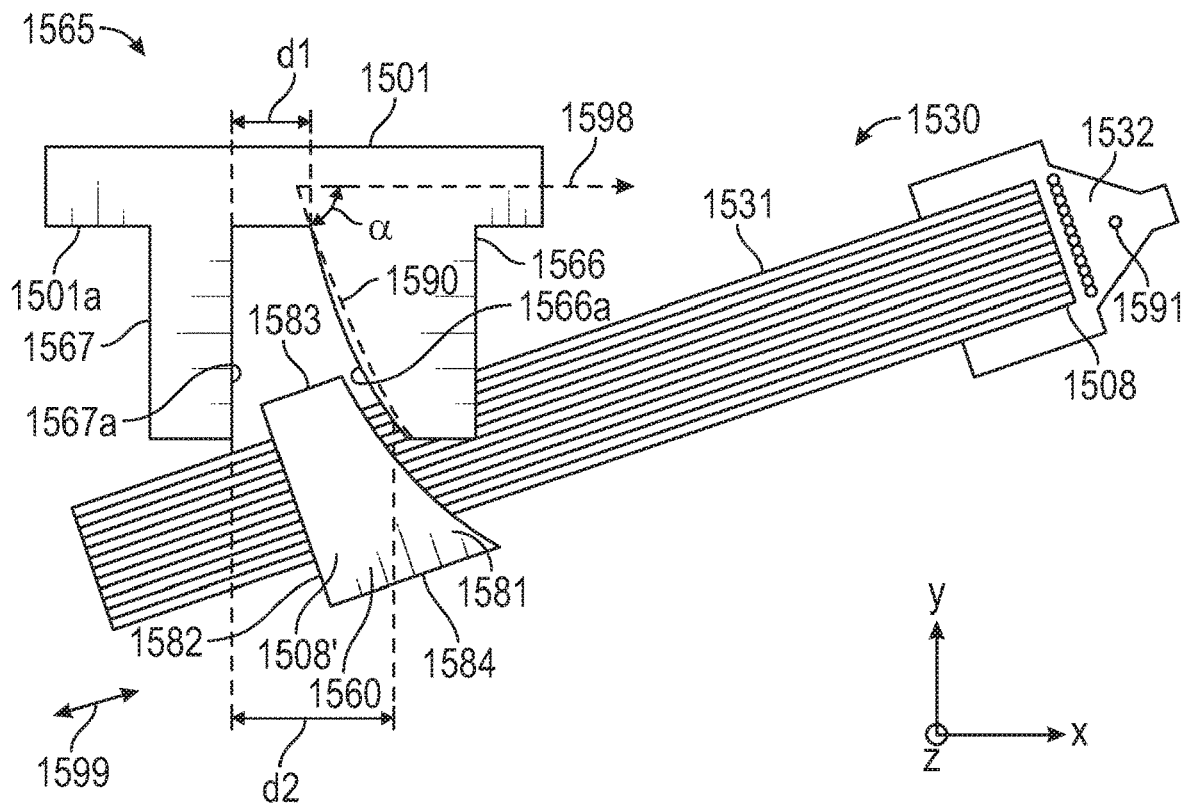
FIGS. 15A and 15B illustrate insertion of a cable retainer having a curved side into a retainer mount in accordance with some embodiments.
Figure 15B:
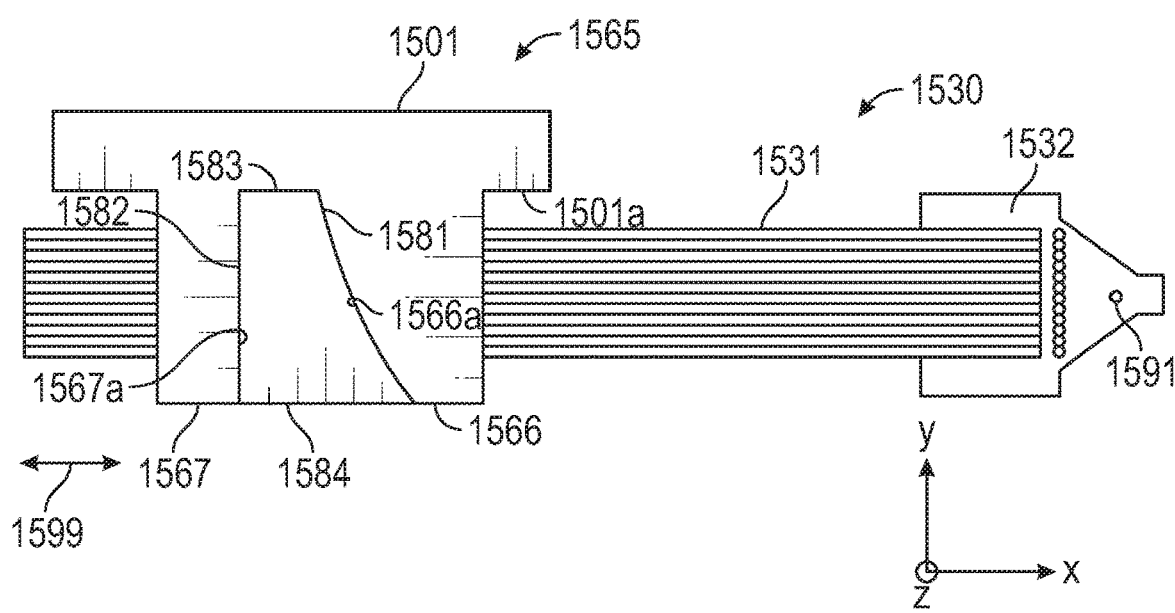

The cable retainer need not be trapezoidal and may have curved sides as illustrated in FIGS. 15A and 15B. The retainer mount 1565 has a shape that accommodates the shape of the cable retainer 1560. FIG. 15A shows an optical ferrule subassembly 1530 comprising an optical ferrule 1532 attached to optical waveguides 1531 at a first attachment location 1508. A cable retainer 1560 is attached to the optical waveguides 1531 at a second attachment location 1508'. In the illustrated embodiment, the cable retainer 1560 is not a trapezoid, having one curved side 1581. Second side 1582 opposes the curved side 1581 and third and fourth opposing sides 1583, 1584 are substantially parallel to one another. First and second sides 1581, 1582 extend laterally across the optical waveguides 1531. Third and fourth sides 1583, 1584 extend along the longitudinal axis 1599 of the waveguide 1531. Side 1583 is shorter than side 1584.

The retainer mount 1565 includes first and second walls 1566, 1567 that extend from an inner surface 1501a of the side 1501 of the frame. The first wall 1566 has a first surface 1566a that has the same curvature as the first side 1581 of the cable retainer 1560. The second wall 1567 has a second surface 1567a that faces the first surface 1566a. A line 1590 drawn from the base to the tip of surface 1566a makes a non-perpendicular angle, a, with respect to the mating axis 1598 of the frame (x-axis in FIGS. 15A and 15B) wherein a is sufficient to allow insertion of the cable retainer 1560 into the retainer mount 1565 by rotating the optical ferrule subassembly 1530 around a rotation point 1591 located on or near the optical ferrule 1532. For example a may be between about 70 to about 85 degrees or about 80 degrees with respect to the mating axis 1598 of the frame. The second surface 1567a is oriented about perpendicular with respect to the mating axis 1598. To facilitate rotational insertion of the cable retainer 1560 into the retainer mount 1565, the first distance d1 between the first surface 1566a and the second surface 1567a at a location nearer to the inner surface 1501a of the frame side 1501 is smaller than a second distance d2 at a location farther from the inner surface 1501a of the frame side 1501.

As illustrated in FIGS. 14A and 14B, installation of the cable retainer 1560 into the retainer mount 1565 involves rotating the optical ferrule subassembly 1530 around the z axis which is perpendicular to the mating axis 1598 wherein the point of rotation 1591 is located on or proximate to the ferrule 1532. The smaller of the parallel sides 1583 of the cable retainer 1560 is inserted into the retainer mount 1565 first, and the optical cable subassembly 1530 is rotated around point 1599 until the cable retainer 1560 is disposed within the retainer mount 1565. When fully inserted, the first surface 1566a of the retainer mount 1565 is adjacent to the curved side 1581 that is disposed laterally across the waveguides 1531. The second surface 1567a of the retainer mount 1565, which is behind the first surface 1566a along the mating axis 1598, is adjacent to the second side 1582 that is substantially perpendicular to the longitudinal axis 1599 of the waveguide 1531. FIG. 15B shows the cable retainer 1560 after it is fully installed in the retainer mount 1565. Insertion of the cable retainer 1560 into the retainer mount 1565 prevents movement of the cable retainer 1560 along the mating axis 1598 and secures the second attachment area 1508' of the optical waveguide 1531 within the frame.

Figure 12D:
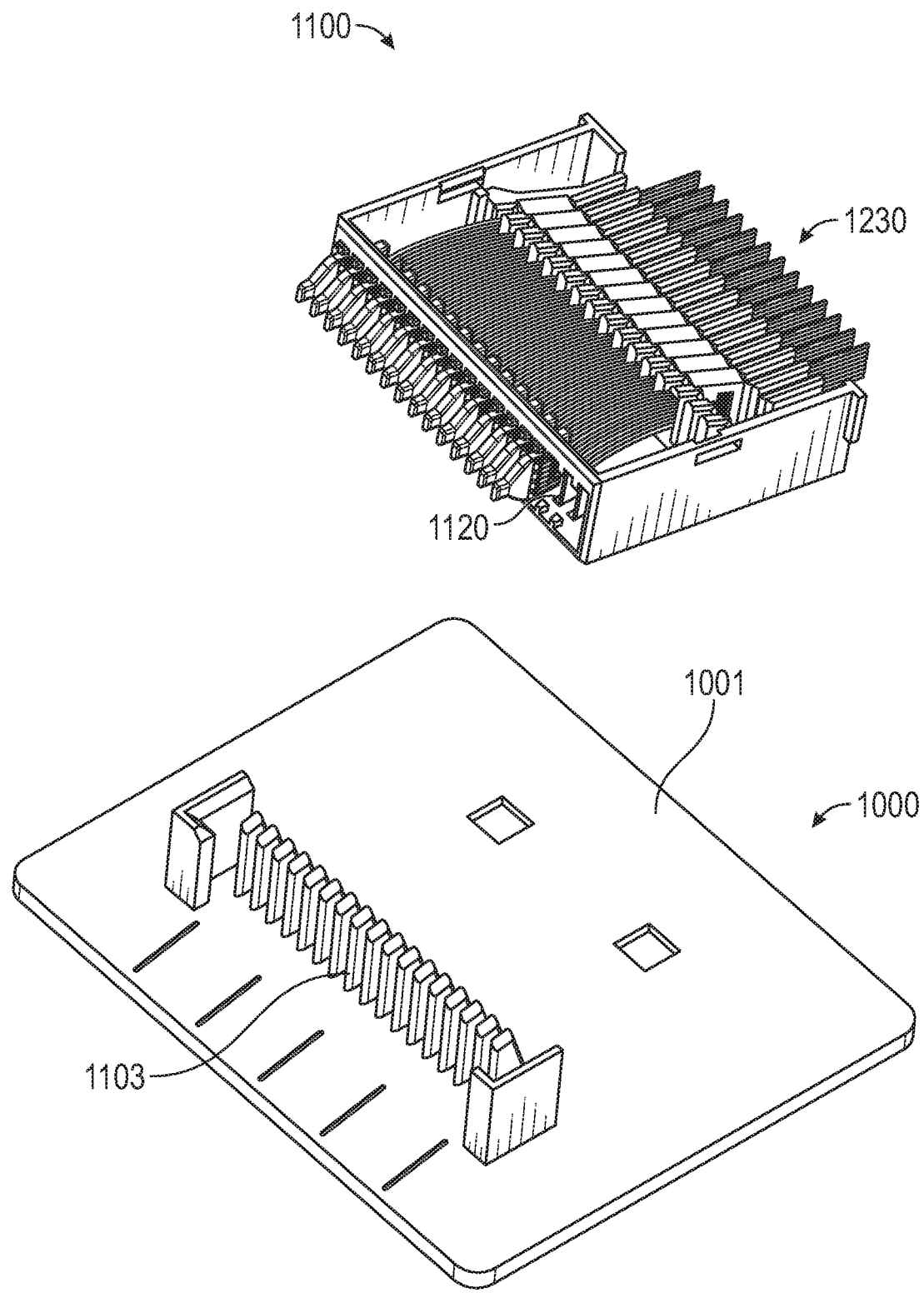

Returning now to FIG. 12C, after installation of the optical ferrule subassemblies 1230, the frame 1100 and the optical ferrule subassemblies 1230 installed therein are lifted from the base 1001 of the ferrule installation tool 1000, which removes the teeth 1003 of the ferrule installation tool 1000 from the holes 1120 in the frame 1100 as illustrated in FIG. 12D. The frame 1100 with the optical ferrule assemblies 1230 installed therein may be inserted into a hood as illustrated in FIG. 6 and the cassette, comprising the frame and hood, may be installed into an optical connector.

Figure 13:
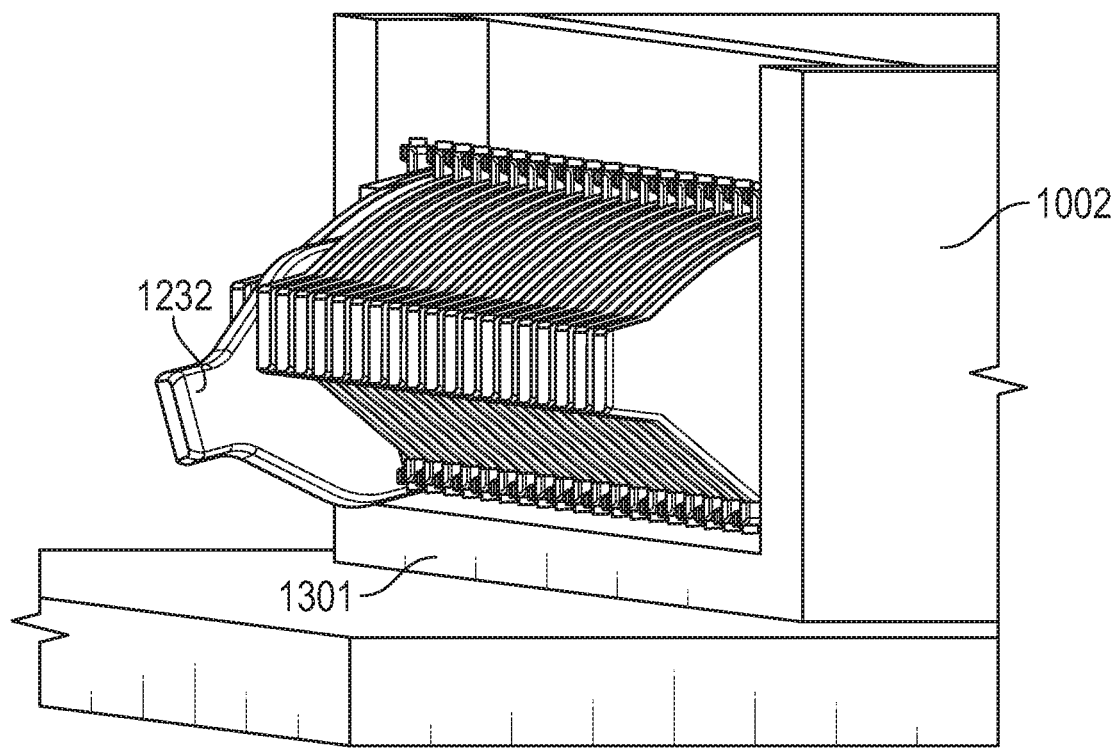
FIG. 13 illustrates a ferrule installation tool having a lip in accordance with some embodiments.

According to some aspects, the ferrule installation tool includes a lip that extends along the base of the installation tool. When corner supports are present, the lip 1301 may extend between the corner supports 1002 as illustrated in FIG. 13. During installation of the optical ferrule subassemblies, the lip 1301 restrains movement of the ferrules 1232 along the x-axis and restricts extension of the optical waveguides during installation of the optical ferrule subassemblies into the frame 1100.

Additional information regarding optical ferrules, optical assemblies, and optical connectors that may be used in conjunction with the approaches described herein is provided in the following commonly owned U.S. patent applications which are incorporated herein by reference: U.S. Patent Application Ser. 62/240,000, filed Oct. 12, 2015; U.S. Patent Application Ser. 62/240,069, filed Oct. 12, 2015; U.S. Patent Application Ser. 62/240,066, filed Oct. 12, 2015; U.S. Patent Application Ser. 62/240,008, filed Oct. 12, 2015; and U.S. Patent Application Ser. No. 62/239,996, filed Oct. 12, 2015.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. An optical assembly, comprising:
a hermaphroditic cassette comprising:
a hood that includes a narrower section and a wider section and separated by slots such that the narrower section fits at least partially within a wider section of an identical mating hood of a mating optical assembly and the wider section receives a narrower section of the mating hood; and
first and second stop features configured to engage with second and first stop features of the mating hood, the first stop feature comprising a mating end of the narrower section of the hood and the second stop feature comprising a stop surface disposed within the wider section of the hood, engagement of the stop features of the hood with stop features of the mating hood configured to stop relative translational movement of the hood and the mating hood along the mating axis during mating.

2. An optical assembly, comprising:
a cassette comprising:
a hood that includes a narrower section and a wider section, the narrower section extending beyond and behind the wider section and configured to fit at least partially within a wider section of a mating hood of a mating optical assembly and the wider section configured to receive a narrower section of the mating hood;
first and second slots disposed on opposing sides of the hood, the first and second slots separating at least a portion of the narrower section from at least a portion of the wider section, each slot having an opening at a mating end of the hood and slot walls that extend to an end of the slot, the first and second slots configured to engage with second and first slots of the mating hood; and
first and second stop features configured to engage with second and first stop features of the mating hood, the first stop feature comprising a mating end of the narrower section of the hood and the second stop feature comprising a stop surface disposed within the wider section of the hood, engagement of the stop features of the hood with stop features of the mating hood configured to stop relative translational movement of the hood and the mating hood along the mating axis during mating before the ends of the first and second slots make contact with ends of the first and second slots of the mating hood.

3. The optical assembly of claim 1, wherein the engagement of the stop features of the hood with the stop features of the mating hood is configured to stop relative translational movement of the hood and the mating hood along the mating axis during mating before the ends of the first and second slots of the hood make contact with ends of the first and second slots of the mating hood.

4. The optical assembly of claim 2, further comprising:
at least one optical ferrule subassembly disposed within the hood, the ferrule subassembly comprising:
at least one optical waveguide; and
an optical ferrule attached to the optical waveguide at a first location of the optical waveguide.

5. The optical assembly of claim 4, wherein:
a second location of the optical waveguide is secured within the hood; and
a bend in the optical waveguide between the first location and the second location, wherein, after mating, the bend in the optical waveguide contributes to a spring force that holds the optical ferrule in mating alignment with a mating optical ferrule.

6. The optical assembly of claim 5, further comprising a cable retainer attached to the optical waveguide at the second location of the optical waveguide, the cable retainer configured to secure the second location of the optical waveguide within the cassette.

7. The optical assembly of claim 6, wherein the hood further comprises a retainer mount comprising one or more flexible latching members configured to hold the cable retainer within the hood.

8. The optical assembly of claim 7, wherein the flexible latching members are configured to flex away from each other to receive the cable retainer and to flex toward each other when the cable retainer is within the hood.

9. The optical assembly of claim 8, wherein:
each flexible latching member comprises an elongated flexible arm portion and a finger portion at an end of the arm portion; and when the cable retainer is within the hood, each elongated flexible arm portion extends along a first side of the cable retainer and the finger portion extends along a second side of the cable retainer adjoining the first side.

10. The optical assembly of claim 6, wherein the cable retainer is trapezoidal in shape having two opposing sides that are parallel with each other and two opposing sides that are non-parallel with each other, the parallel sides disposed along a longitudinal axis of the optical waveguide and the non-parallel sides disposed laterally across the optical waveguide.

11. The optical assembly of claim 10, further comprising:
a first surface extending from an inner surface of a first side of the hood, the first surface arranged to engage with one of the non-parallel sides of the cable retainer; and
a second surface extending from an inner surface of an opposing second side of the hood, the second surface configured to engage the other of the non-parallel sides of the cable retainer.

12. The optical assembly of claim 2, further comprising one or more curved alignment shoulders within the hood, surfaces of the curved alignment shoulders configured to support an optical ferrule before the optical assembly mates with a mating optical assembly.

13. The optical assembly of claim 2, further comprising a chamfered edge disposed at a mating end of the hood.

14. The optical assembly of claim 2, further comprising one or more ribs disposed within the hood, the ribs extending within the hood from a mating end of the cassette toward the non-mating end, each rib having a chamfered edge at the mating end.

15. The optical assembly of claim 2, wherein:
the cassette further comprises a frame disposed within the hood; and
at least one optical ferrule disposed within the frame.

16. The optical assembly of claim 15, wherein the frame includes one or more curved alignment shoulders within the hood, surfaces of the curved alignment shoulders configured to support the at least one optical ferrule before the optical assembly mates with a mating optical assembly.

17. The optical assembly of claim 15, wherein the frame includes a brace extending across a mating end of the frame.

* * * * *